(12) United States Patent
Kim et al.

(10) Patent No.: US 7,106,069 B2
(45) Date of Patent: Sep. 12, 2006

(54) APPARATUS FOR DETECTING ARC FAULT

(75) Inventors: Cheon-Youn Kim, 103-1102 Daewoo 2 cha APT., 925-7 Dongchun-dong, yeonsu-gu, 406-130 Incheon (KR); Dong-Seb Kim, Kyeongsan-Si (KR); Joung-Myoung Ko, Kwangju (KR); Je-Chun Moon, Anyang-Si (KR)

(73) Assignees: Human El-Tech, Inc., (KR); Cheon-Youn Kim, (KR)

( * ) Notice: Subject to any disclaimer, the term of this patent is extended or adjusted under 35 U.S.C. 154(b) by 0 days.

(21) Appl. No.: 10/860,635

(22) Filed: Jun. 4, 2004

(65) Prior Publication Data

US 2005/0017732 A1    Jan. 27, 2005

Related U.S. Application Data

(63) Continuation-in-part of application No. 10/640,246, filed on Aug. 14, 2003.

(30) Foreign Application Priority Data

Nov. 15, 2002   (KR)   ...................... 10-2002-0071166

(51) Int. Cl.
*G01R 31/08*   (2006.01)
*H01H 9/50*    (2006.01)
*H02H 3/00*    (2006.01)

(52) U.S. Cl. .......................... 324/522; 324/536; 361/42

(58) Field of Classification Search ................ 324/536, 324/522–524, 500; 361/42
See application file for complete search history.

(56) References Cited

U.S. PATENT DOCUMENTS

| 5,420,740 | A |   | 5/1995  | MacKenzie et al. |
|-----------|---|---|---------|------------------|
| 5,432,455 | A |   | 7/1995  | Blades |
| 5,452,223 | A |   | 9/1995  | Zuercher et al. |
| 5,896,262 | A | * | 4/1999  | Rae et al. ..................... 361/94 |
| 6,433,978 | B1 | * | 8/2002 | Neiger et al. ................. 361/42 |
| 6,570,392 | B1 | * | 5/2003 | Macbeth et al. ............ 324/536 |
| 6,667,691 | B1 | * | 12/2003 | Sapir ........................... 340/635 |

* cited by examiner

*Primary Examiner*—Anjan Deb
*Assistant Examiner*—Jeff Natalini
(74) *Attorney, Agent, or Firm*—Rabin & Berdo, PC

(57) ABSTRACT

An apparatus for detecting an arc fault. The apparatus comprises a current detector for detecting the amount of change of current flowing on the wire and generating a signal proportional to the amount of change; a signal transformer for passing a high frequency component of the signal outputted from the current detector, and limiting a level of the signal not to exceed a fixed signal level; a first level limit amplifier for amplifying a signal outputted from the signal transformer so as to limit the level of the outputted signal; a signal level detector for determining whether a input signal exceeds a fixed first voltage and generating a detection signal; a pulse generator for transforming the detection signal outputted from the signal level detector into a form of normalized pulse; a first arc determination unit for counting a pulse signal outputted from the pulse generator for a predetermined time, determining whether the arc has been occurred and generating an arc detection signal; and a circuit breaker for breaking the conductive wire when the arc detection signal is generated.

6 Claims, 28 Drawing Sheets

November 8, 2002
14:43:34

November 13, 2002
10:21:59

November 8, 2002
15:06:00

November 8, 2002
15:03:20

Ch 2 maximum
25.0 V

November 8, 2002
14:44:06

November 8, 2002
14:44:27

November 8, 2002
15:04:08

November 8, 2002
14:44:50

APPARATUS FOR DETECTING ARC FAULT

This is a continuation-in-part of application Ser. No. 10/640,246, filed Aug. 14, 2003.

FIELD OF THE INVENTION

The present invention relates to an apparatus for detecting an arc fault in a distribution system, and more particularly, to an apparatus for detecting an arc fault, wherein a harmful arc causing a fire can be effectively distinguished from voltages generated when starting electrical equipment and when operating dimmers, which are frequently misconceived as an arc.

BACKGROUND OF THE INVENTION

Distributors in special regions including a city, an industrial area and a commercial area generally use low voltage networks of 600 volts or less. Specially, cables of the networks are laid under the ground, which are designed to inflow into it at sites more than one. Such cables may suffer from faults caused by a thermal degradation, an aging, humidity or animals such as rats or squirrels. A circuit breaker is provided in order to protect the networks from the causes. The circuit breaker is required to have cutting units such as fuses in order to isolate the cable having a fault and minimize network faults in both ends of a cable. The cable cutting units can safely operate in a phase-to-phase fault such as a high voltage and low impedance fault.

Generally, a miniature circuit breaker and an earth leakage breaker are used in the home to protect a fire or an electric shock accident. The miniature circuit breaker is used to protect cables and its operations are as follows. Firstly, in case that a load current is over the rating current, the current flowing in the circuit breaker is higher than normal current and it causes heat. This heat makes an inner Bimetal bent and cuts off an operation of electrical equipment. Secondly, in case that a phase-to-phase short circuit occurs in the load side by an electric tool or other metal material, an high voltage is generated instantaneously and then the Bimetal is heated. So, the inner magnet starts to operate and cuts off the electric equipment before the operation of it. The high voltage generates a lot of magnetic field and then operates the inner magnet of the electric equipment. In case of the earth leakage breaker, there is provided a function that a user can be protected by detecting and cutting off power when the user is struck by electricity in using the electrical equipment, in addition to a function of the miniature circuit breaker.

In United States, it is required that the distributor has the miniature circuit breaker and a consent directly touched by hands of the user has a ground fault circuit interrupter (GFCI). The ground fault circuit interrupter (GFCI) being a kind of earth leakage breaker has a high sensitive function of detecting an electric leakage and it is compulsory to use the interrupter in places having high humidity such as a kitchen, a both room, a parking lot.

Even though the miniature circuit breakers and the earth leakage breakers are established and used, many fires broke out all over the world every year. This is because an arcing type fault to the ground is frequently occurred rather than the phase-to-phase fault described above. Since this arc fault is of a low current and a high impedance and generates a current having a root mean square (RMS) less than a thermal threshold of the breaker, the cable cutting apparatus may not respond to the fault and therefore a fire breaks out in many cases.

Nevertheless, the arc fault is very dangerous since it occurs in a high temperature. And the arc fault can be detected by a Ground Fault Circuit Interrupter (GFCI) in the only case that the arc fault generates a sufficient leakage current through a ground. Moreover, since the interrupter operates when the current occurred by the arc exceeds a parameter of a thermal/magnetic structure of the breaker, an Arc Fault Circuit Interrupter (AFCI) for breaking the arc fault is necessarily required. Specially, Consumer Product Safety Commission (CPSC) gave a decision that 40% of fires broken out in 1977 were due to the arc faults. Accordingly, the National Electric Code (NEC) imposed duty upon every home to use the arc fault circuit interrupter (AFCI) from January of 2002. Causes of arc fault are very various, for example, an aging, breakdowns of insulation and wire, a mechanical and electrical stress by an excessive usage or an excessive voltage, an connection fault, and an excessive mechanical fault to wires. Generally, arc faults occurred in a residential building or a commercial building can be classified into three cases.

Firstly, there is a serial arc (contact arc) occurred between wires serially connected to the load. FIG. 1 shows a case where a serial arc has been occurred. Referring to FIG. 1, a wire 14 and 16 constituting a cable 10 is separated and covered by an insulator 12 so that it can be insulated. In FIG. 1, an upper wire 14 is broken in a predetermined area and a serial gap 18 is generated. When an arc occurs in this state, a lot of heat occurs in the cable locally. And when the heat continues to occur enough to break or carbonize an insulator adjacent to the arc occurring area, a fire would break out. In the serial arc, a magnitude of a current flowing in the arc is controlled by the load.

Secondly, there is a parallel arc (line arc) occurred between conductive wires, which is drawn in FIG. 2. Referring to FIG. 2, conductive wires 24 and 26 in a cable 20 are surrounded by an outer insulator 22 and insulated by an inner insulator 28. When the inner insulator 28 is aged or injured like the part 21, an arc fault 23 occurs between an upper conductive wire 24 and a lower conductive wire 26. The aging or injury of the inner insulator can be generated by a carbonization occurred by excessive exposure of direct ray of light or the lightning which has an influence on a wire system, or by mechanical operations occurred by the cut of a cable extension code part when the cable is pressed under furniture such as a chair.

Thirdly, there is a ground arc occurred between a conductive wire and the ground, which is drawn in FIG. 3. Referring to FIG. 3, the ground arc occurs when an insulator 38 of a cable 30 protecting conductive wires 34 and 36 like the parallel arc is broken and the conductive wire 36 is grounded through the broken part 39.

Specially, since the parallel arc and the ground arc occur in parallel with a load, a current flowing in the arc changes by an impedance of the power. When the aging phenomenon of the cable continues for a long time as described above, the cover of the cable is damaged due to the carbonization of the cable, and the joule heating is generated due to the arc current so that the cable is aged more severely. At that time, the joule heating is J=(arc current)$^2$×time and an arc occurs due to the carbonization of the cable in accordance with the joule heating.

FIG. 4 is a block diagram showing a constitution of a general apparatus for detecting an arc fault in the art.

Referring to FIG. 4, the conventional apparatus for detecting an art fault includes current detector 400, a signal transformer 402, a level determination unit 404, an arc signal detector 406, and a circuit breaker 408. In the conventional apparatus for detecting an arc fault, the detector 400 detects a current flowing on a phase conductive wire 416, and the signal transformer 402 transforms a signal detected in the current detector to a signal suitable for determining the arc.

The level determination unit 404 determines whether an output level of the signal transformer 402 exceeds a predetermined reference voltage, and generates an output signal when the output level exceeds the reference voltage. The arc signal detector 406 integrates an output signal of the level determination unit 404 and determines whether the integrated signal exceeds a predetermined reference voltage, and generates an arc detection signal when the integrated signal exceeds the reference voltage. The arc detection signal is inputted to the circuit breaker 408, and the circuit breaker breaks the phase conductive wire connecting a source 410 to a load 412.

Referring to the arc detector, the most difficult problem is a signal when starting electric equipment and a signal from a dimmer. Both signals are nearly similar in their forms so that a conventional arc fault detector misconceives the signals occurred when starting the electrical equipment and occurred by the dimmer as an arc and often breaks the circuit.

Since a waveform occurred when starting the electrical equipment and that of a harmful arc occurring a fire and so on are similar, the conventional apparatus for detecting an arc fault discriminates both waveforms by making use of a characteristic that both waveforms have different duty cycles, and breaks the circuit. The reason why the arc signal detector 406 integrates the output signal of the level determination unit is to determine a duty cycle of a signal.

A signal generated when the dimmer is operated is similar with that of an arc in their waveforms and also has a characteristic that its duty cycle is long, which is different from the signal generated when starting the electric equipment. Accordingly, the conventional apparatus for detecting an arc fault has a problem that it misconceives a signal occurred when operating the dimmer as an arc signal and breaks a fixed circuit. Also, since the signal occurred when operating the dimmer is nearly similar with that of an arc signal in their magnitude, an apparatus for detecting the arc using a magnitude of the conventional signal cannot make a distinction between a harmful arc and a signal occurred when operating the dimmer.

SUMMARY OF THE INVENTION

Therefore, the present invention has been made in view of the above problems, and it is an object of the present invention to provide an apparatus for detecting an arc fault in order to prevent a fault trip by making a distinction between an arc signal and signals occurred when operating a dimmer and when starting electric equipment.

It is another object of the present invention to provide an apparatus for detecting in order to make a distinction between an arc signal and signals occurred when operating a dimmer and when starting electric equipment, by making use of a characteristic that a frequency of the arc signal is higher than those of the signal occurred when operating the dimmer and when starting the electric equipment.

It is yet another object of the present invention to provide an apparatus for detecting an arc fault, which amplitudes a detected signal, determines a frequency component and detects an arc signal in order to understand a frequency characteristic of the detected signal more precisely.

In accordance with the present invention, the above and other objects can be accomplished by the provision of an apparatus for detecting an arc fault, comprising a current detector for detecting the amount of change of current flowing on the wire and generating a signal proportional to the amount of change; a signal transformer for passing a high frequency component of the signal outputted from the current detector, and limiting a level of the signal not to exceed a fixed signal level; a first level limit amplifier for amplifying a signal outputted from the signal transformer so as to limit the level of the outputted signal; a signal level detector for determining whether a input signal exceeds a fixed first voltage and generating a detection signal; a pulse generator for transforming the detection signal outputted from the signal level detector into a form of normalized pulse; a first arc determination unit for counting a pulse signal outputted from the pulse generator for a predetermined time, determining whether the arc has been occurred and generating an arc detection signal; and a circuit breaker for breaking the conductive wire when the arc detection signal is generated.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detailed with reference to the annexed drawings.

Figure 5:
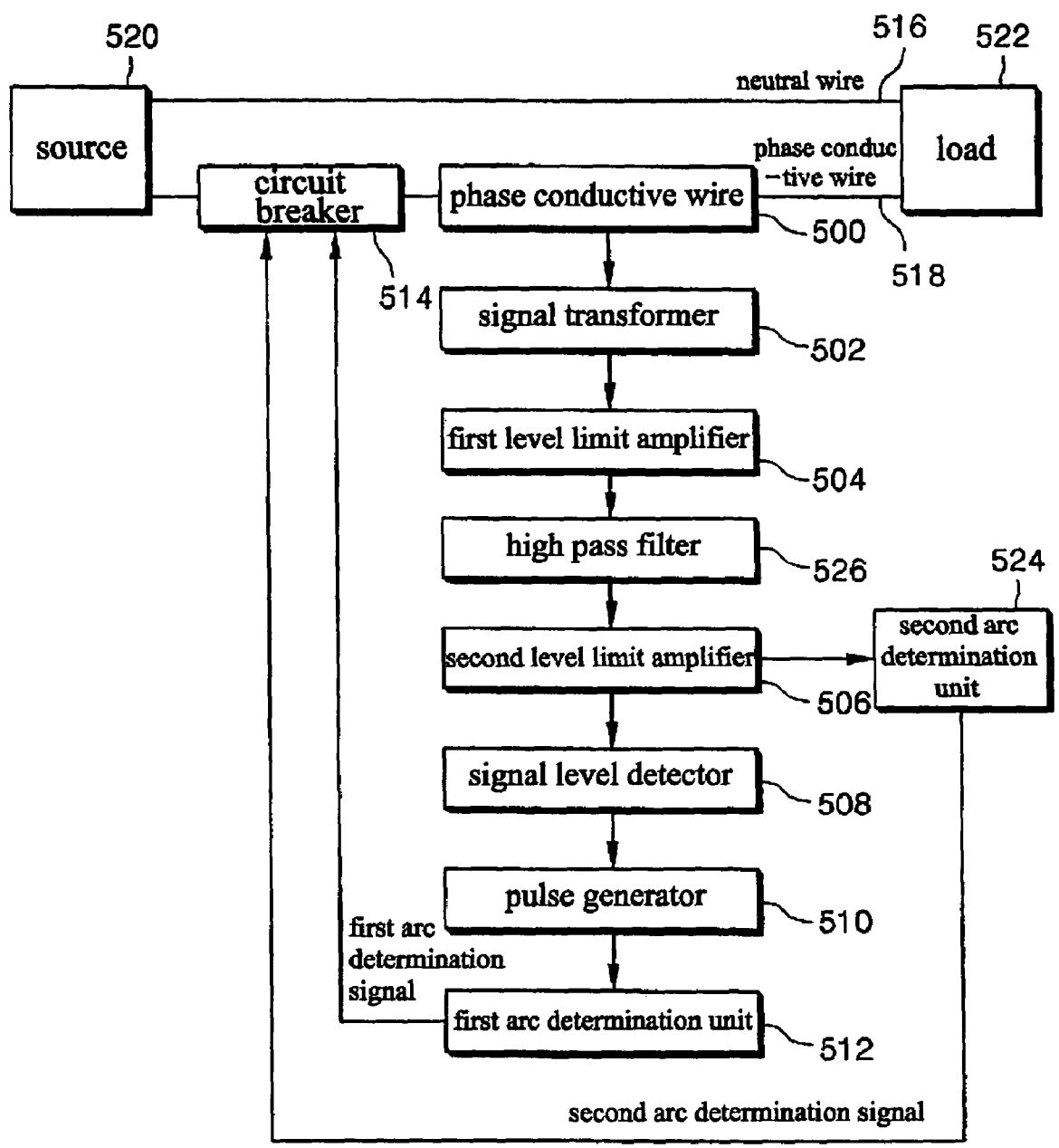
FIG. 5 is a block diagram showing an apparatus for detecting an arc fault in accordance with a preferred embodiment of the present invention.

FIG. 5 is a block diagram showing an apparatus for detecting an arc fault in accordance with a preferred embodiment of the present invention.

As shown in FIG. 5, an apparatus for detecting an are fault may include a current detector 500, a signal transformer 502, a first level limit amplifier 504, a high pass filter 526 and a second level limit amplifier 506, a signal level detector 508, a pulse generator 510 and a first arc determination unit 512, a circuit breaker 514 and a second arc determination unit 524. The current detector 500 senses an amount of change of a current flowing on a phase conductive wire 518 and outputs a current detection signal. Even though FIG. 5 shows a case that the current detector is connected to the phase conductive wire 518 which is connected between a source and a load, those skilled in the art will appreciate that the cases that the current detector 500 is connected to a neutral wire and to a neutral wire and the phase conductive wire are included in the scope of the present invention. In accordance with an embodiment of the present invention, it is desirable to embody the current detector 500 as a current transformer CT. In case of using the current transformer, a detected signal will be outputted as a form of a voltage.

The signal transformer 502 implements a function to transform an output signal of the current detector 500 into a signal with which it is determined whether an arc has been occurred or not. The current detection signal outputted from the current detector 500 is an alternating form, and generally has a very high root mean square. Accordingly, the signal transformer rectifies a current detection signal and functions to limit a magnitude of a signal level to a value in which a fixed circuit can be protected. At the same time, the signal transformer 502 implements a function to pass the signal having a high frequency among signals outputted from the current detector 500. Since the arc signal includes much of high frequency signal and a normal commercial frequency is a low frequency, the signal transformer passes the high frequency only.

The first level limit amplifier 504 implements a function to amplify the signal outputted from the signal transformer. The present invention detects the arc by making use of a characteristic that the arc signal includes more high frequency component than the signal when starting electric equipment and the dimmer signal. The signal outputted from the current detector consists of a main signal having high amplitude and a side signal having small amplitude between main signals. Since the arc signal is a high frequency signal, the side signals between main signals are generated much more.

However, since the side signals have very small amplitudes, it is difficult to detect them. Accordingly, in accordance with the present invention, signals outputted from the signal transformer 502 are amplified through a first level limit amplifier 504 in order to precisely detect the side signals. Since the main signals have high amplitudes and the circuit may be damaged when signals having high amplitudes are amplified again, the signals may be amplified by limiting the amplification level in accordance with the present invention;

In accordance with an embodiment of the present invention, it is possible to amplify the output signal of the signal transformer 502 using a general OP amplifier. In accordance with another embodiment of the present invention, it may be possible to amplify signals using another amplification device having transistors.

The high pass filter 526 passes the only signals having high frequency component among the output signals of the first level limit amplifier 504. As described above, the first level limit amplifier 504 can be embodied as the OP amplifier or the transistors, and the output signals of those active devices may include many noise components. Accordingly, the high pass filter 526 removes the noise components occurring the outputs of the active devices.

The second level limit amplifier 506 amplifies the output signal of the high pass filter 526. When passing the high pass filter 526, the signal level is attenuated due to a distribution of impedance and a removal of the low frequency signal. Accordingly, the second level limit amplifier amplifies the attenuated signal again, and the difference of amplitudes between side signals and main signals becomes less by the amplification two times. A detailed constitution of the second level limit amplifier will be described in conjunction with another drawing.

The second arc determination unit 524 determines whether an arc is detected by integrating the output signal of the second level limit amplifier 506 for a predetermined time. The second arc determination unit implements a function to determine an instantaneous arc such as a parallel arc.

The signal level detector 508 implements a function to compare the output signal of the second level limit amplifier 506 with a reference signal level and output a detected signal when the output signal of the amplifier 506 is higher than the reference signal level. In accordance with an embodiment of the present invention, a signal level comparison in the signal level detector can be implemented using a general OP amplifier or a plurality of transistor.

In accordance an embodiment of the present invention, a voltage stabilization circuit can be included between the second level limit amplifier 506 and the signal level detector 508, and the output signal of the voltage stabilization circuit is inputted to the signal level detector 508 in this case.

A pulse signal generator 510 implements a function to generate a pulse signal having a predetermined width and height in case of outputting the detected signal in the signal level detector 508. The present invention makes use of a characteristic that the arc signal has more high frequency components than the signal of dimmer and the signal occurred when starting electric equipment in order to discriminate a signal of the dimmer and a signal occurred when starting electric equipment from an arc signal. That is, the arc signal outputs a detected signal of the signal level detector 508 more frequently than the signal of dimmer and the signal occurred when starting electric equipment. However, the signal of the dimmer and the signal occurred when starting the electric equipment are not fixed in their signal magnitudes and signal widths and change differently. Accordingly, in order to count a detection frequency of a signal precisely, pulses having fixed width and magnitude of the signal are generated when the detected signal is outputted from the signal level detector 508 in accordance with the present invention. The detailed constitution of the pulse generator 510 will be described in conjunction with another drawings.

The first arc determination unit 512 implements a function to receive a pulse signal occurred in the pulse generator 510 and determine whether an arc has been occurred or not. The first arc determination unit 512 implements a function to count the pulses generated in the pulse generator 510 and determine whether an arc has been occurred or not. That is, the first arc determination unit 512 compares the number of the predetermined pulses with the received number of the pulses for a fixed time, and outputs the arc detected signal when the received number of pulses is more than the number of the predetermined pulses. As described above, the arc signal has more high frequency component compared with the signal of dimmer and the signal occurred when starting electric equipment. Accordingly, the signal of dimmer and the signal occurred when starting electric equipment generate less number of pulses compared with the arc. At the same time, since the signal of a high frequency component is amplified by the first and the second level limit amplifiers, it is possible to detect the high frequency components more precisely.

Figure 1:
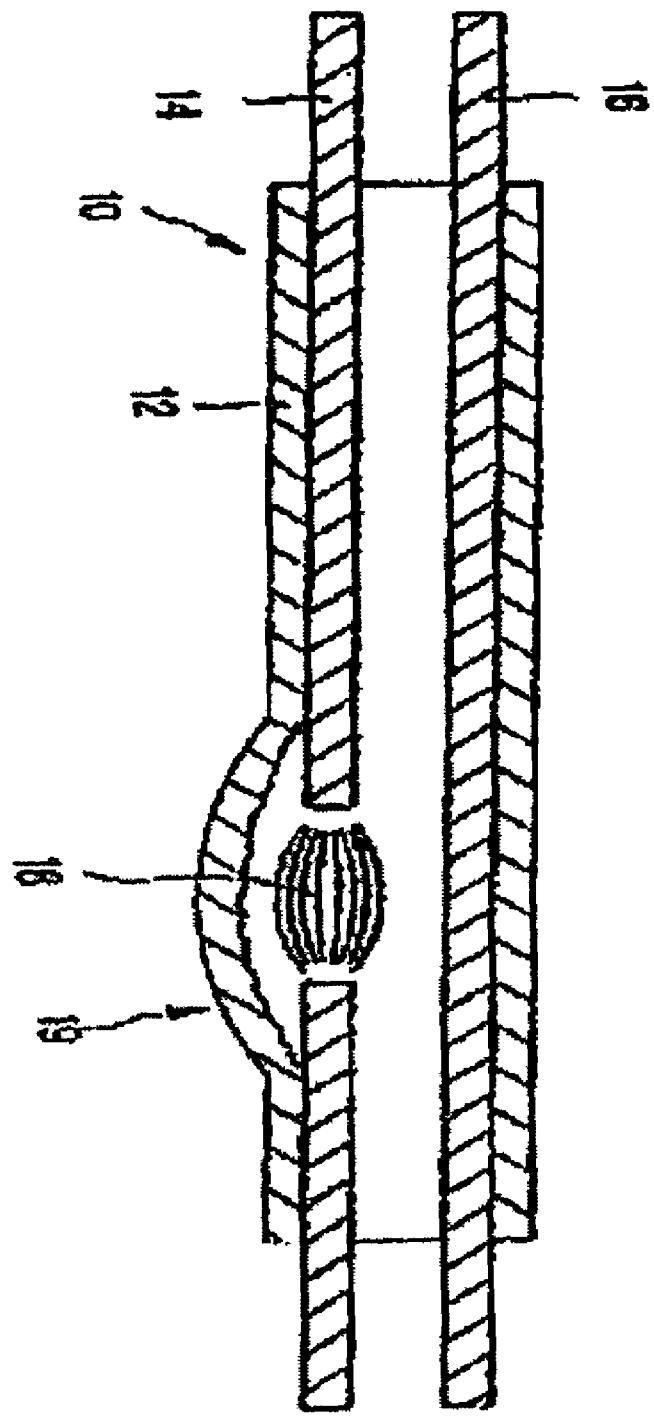
FIG. 1 is a view in case that a serial arc is occurred.
Figure 2:
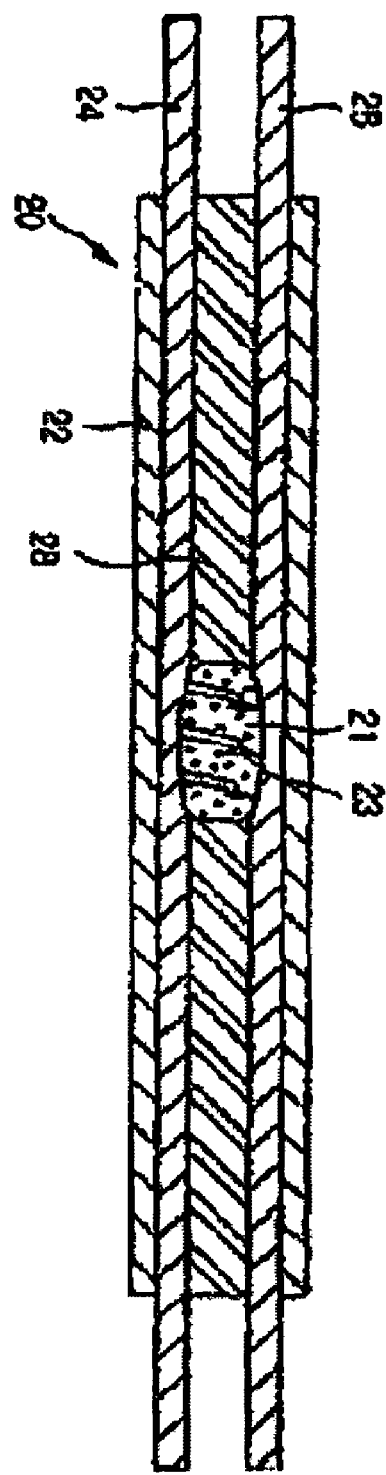
FIG. 2 is a view in case that a parallel arc is occurred.
Figure 3:
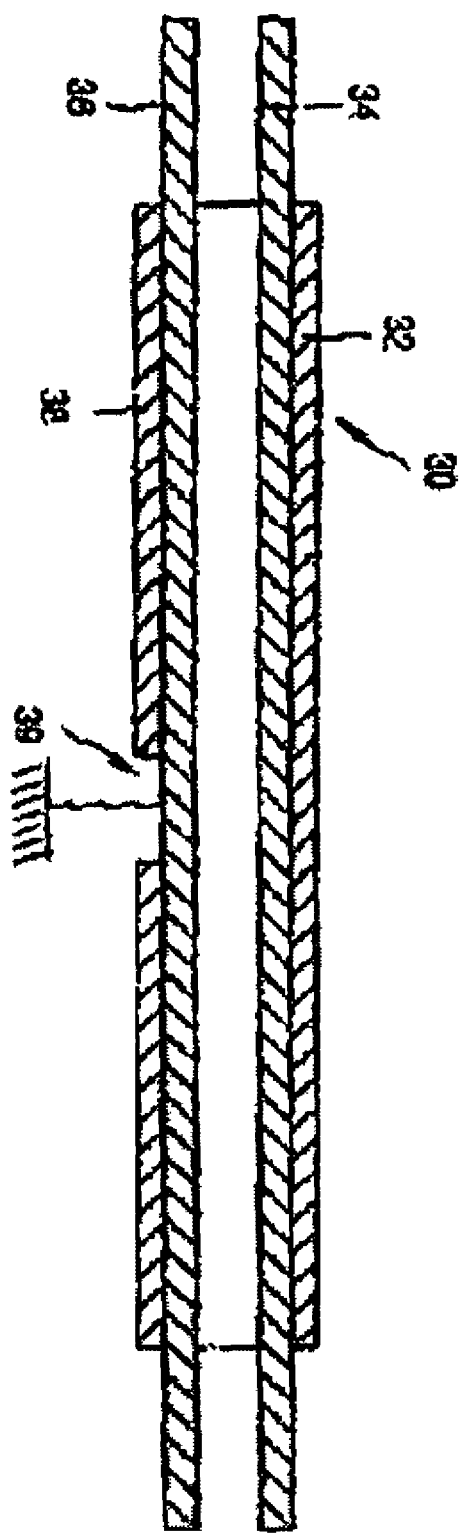
FIG. 3 is a view in case that a ground arc is occurred.

The circuit breaker 514 implements a function to receive the first arc detection signal outputted from the first arc determination unit 512 and the second arc detection signal outputted form the second arc determination unit and break the phase conductive wire connecting the source to the load. Even though FIG. 1 shows that the circuit breaker 514 is coupled with the phase conductive wire 518 and breaks the phase conductive wire 518, it is evident that those skilled in the art will know that the circuit breaker 514 may be coupled with the neutral wire 516 and break the neutral wire 516.

In accordance with the present invention, the circuit breaker 514 may include a solenoid and a switch, turn on the solenoid when the arc detection signal is received, and break the circuit by replacing a position of the switch using a magnetic signal of the solenoid.

Figure 6A:
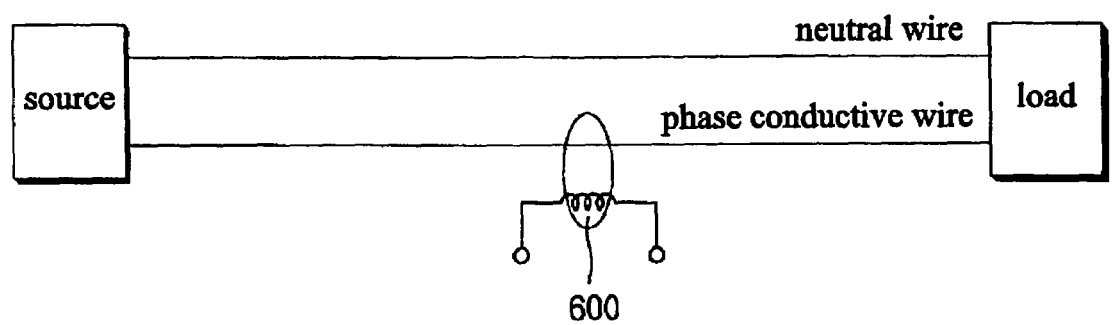
FIG. 6*a* is a view showing a circuit constitution of a current detector in accordance with a preferred embodiment of the present invention.

FIG. 6*a* is a view showing a circuit constitution of a current detector in accordance with a preferred embodiment of the present invention.

As shown in FIG. 6*a*, a current detector in accordance with the present invention can be embodied as a current transformer 600. The current transformer 600 detects an amount of change of current flowing on the phase conductive wire according to the Faraday's law and outputs a voltage which is proportional to the amount of change. The fact that current transformer 600 is connected not to the phase conductive wire but to the neutral wire and can detect the amount of change of current is described above. Since the current flowing on the phase conductive wire is an alternating current, it can be said that the amount of change of current is a value proportional to the magnitude of the current.

Figure 6B:
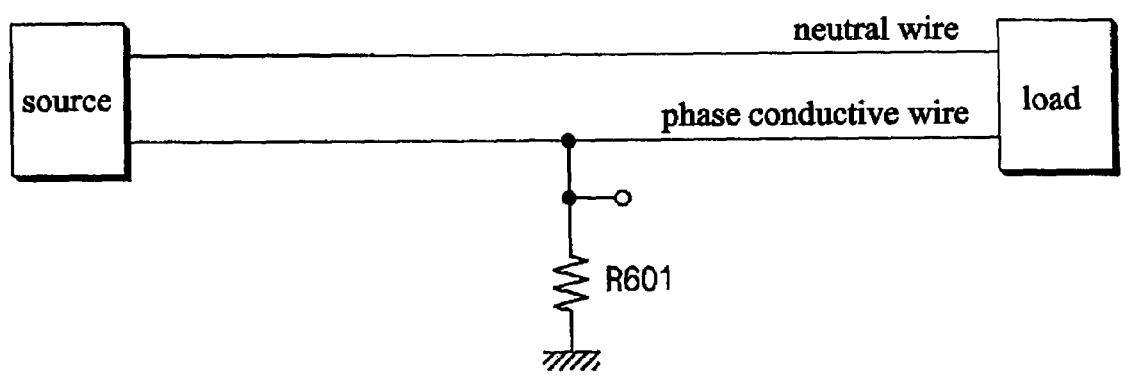
FIG. 6*b* is a view showing a circuit constitution of a current detector in accordance with another preferred embodiment of the present invention.

FIG. 6*b* is a view showing a circuit constitution of a current detector in accordance with another preferred embodiment of the present invention.

A current detection circuit shown in FIG. 6*b* is a circuit for detecting an amount of the current using a shunt method. The shunt method is a method where a current path is separated through parallel resistors and the amount of the current is measured by detecting a magnitude of the current in the separated path.

In FIG. 6*b*, a resistor R601 connected to the phase conductive wire in parallel acts as a parallel resistor. Even though FIG. 6*b* shows a constitution that a parallel resistor is connected to the phase conductive wire, those skilled in the art will appreciate that it is included to the scope of the present invention to connect the neutral wire to the parallel resistor. When a resistor R601 is connected to the phase conductive wire in parallel, a current will flow to the parallel resistor according to a ratio of an inherent impedance of the phase conductive wire and a magnitude of the parallel resistor. Since the magnitudes of the currents flowing on the phase conductive wire and on the resistor R601 are in a proportional relation, information of magnitude of current flowing on the parallel resistor may be used to determine an amount of a current.

In accordance with another embodiment of the present invention, the current detector 500 is constituted as a logosky sensor and may output the signal proportional to an amount of the change of the current as a voltage as is similar with the current transformer.

Figure 7A:
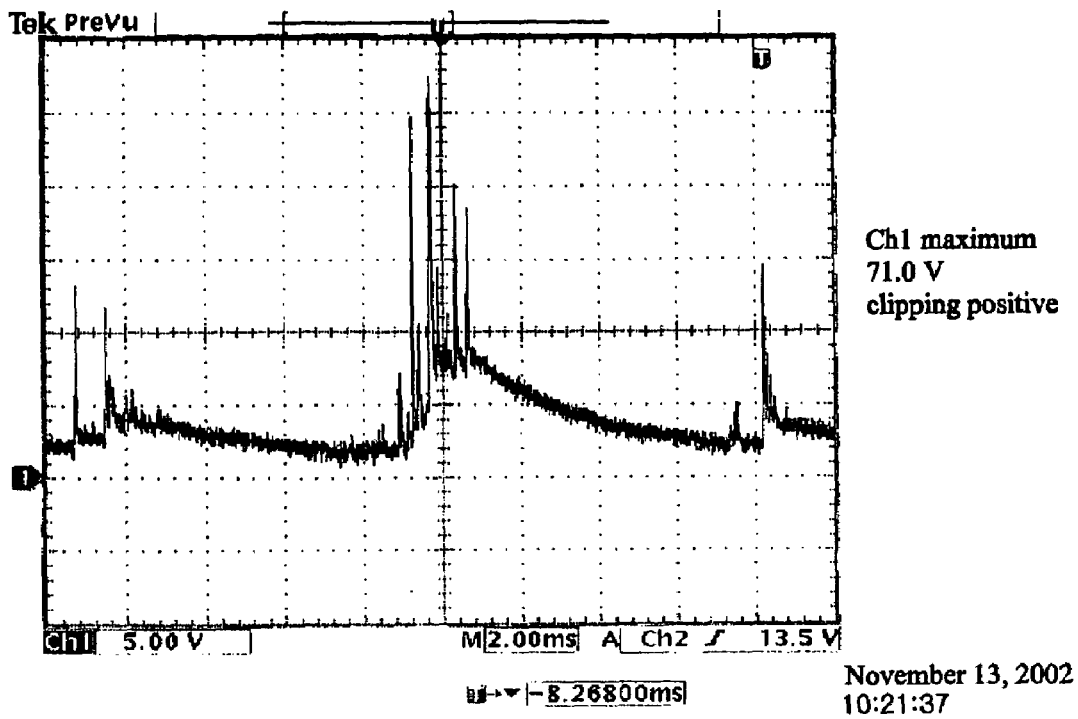
FIG. 7*a* is a view showing an example of arc signal waveform outputted from a current detector.
Figure 7B:
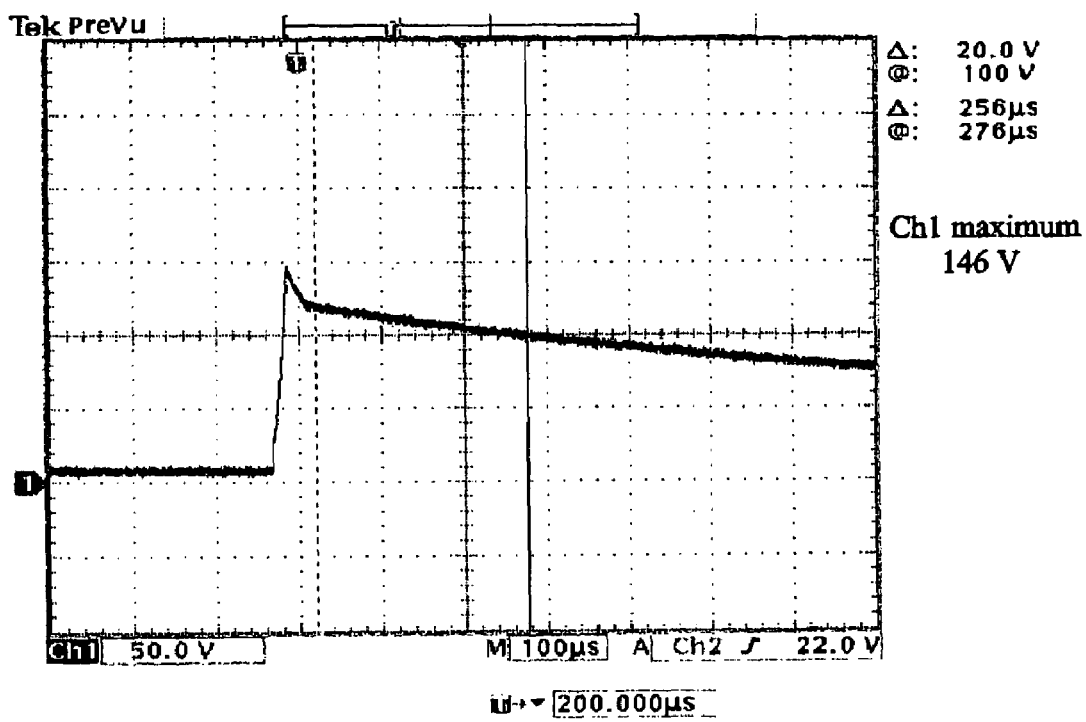
FIG. 7*b* is a view showing an example of signal waveform of a dimmer outputted from a current detector.
Figure 7C:
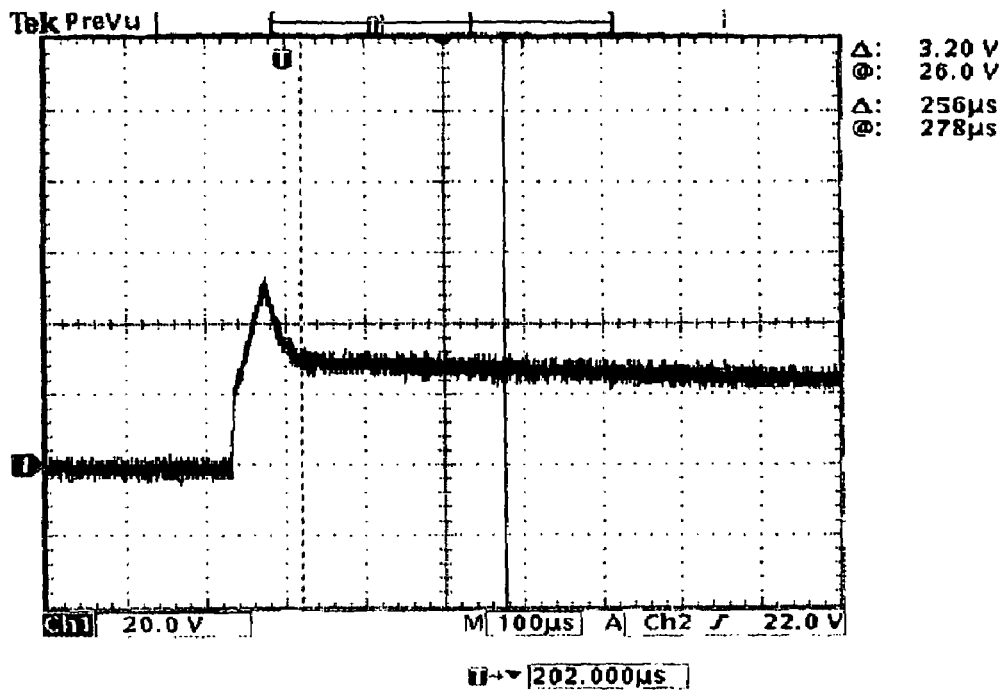
FIG. 7*c* is a view showing an example of signal waveform occurred when starting electric equipment outputted from a current detector.
Figure 7D:
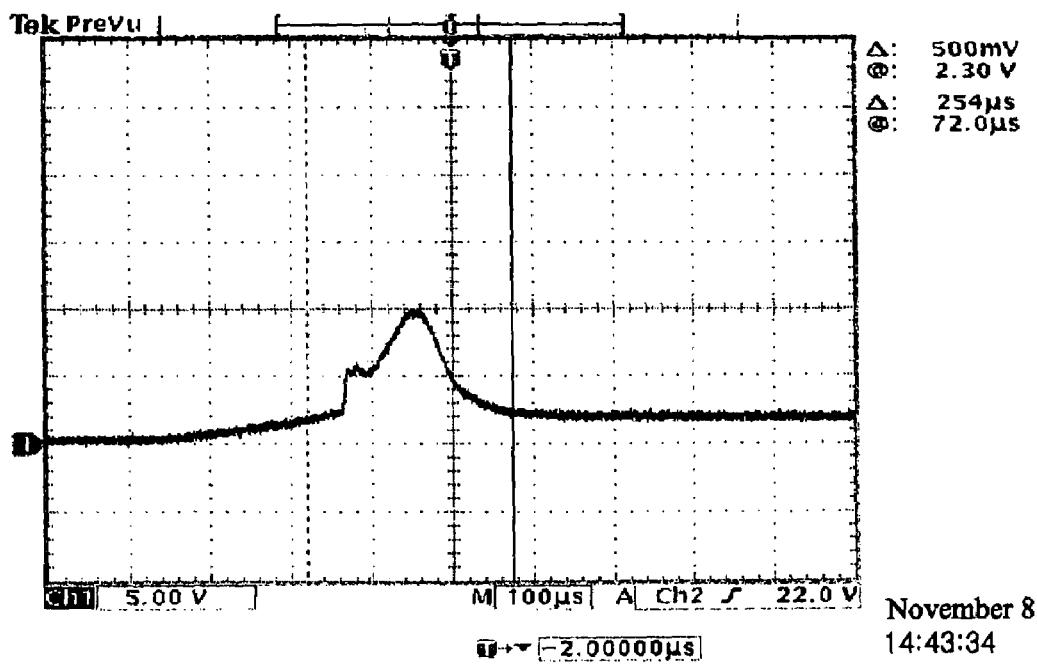
FIG. 7*d* is a view showing an example of normal signal waveform outputted from a current detector.

FIG. 7a is a view showing an example of arc signal waveform outputted from a current detector, FIG. 7b is a view showing an example of signal waveform of a dimmer outputted from a current detector, FIG. 7c is a view showing an example of signal waveform occurred when starting electric equipment outputted from a current detector, and FIG. 7d is a view showing an example of normal signal waveform outputted from a current detector.

As shown in FIGS. 7a to 7d, it is confirmed that an output signal of a dimmer or a signal occurred when starting electric equipment has a high signal level but it is a high frequency signal in general. In case of the arc signal, there exist many side signals having relatively low voltage levels between main signals besides the main signals, which are confirmed to be high frequency compared with other signals. Also, the arc signal has high amplitude compared with a normal signal. It is confirmed that the normal signal waveform has a low amplitude and low frequency signal.

Figure 8:
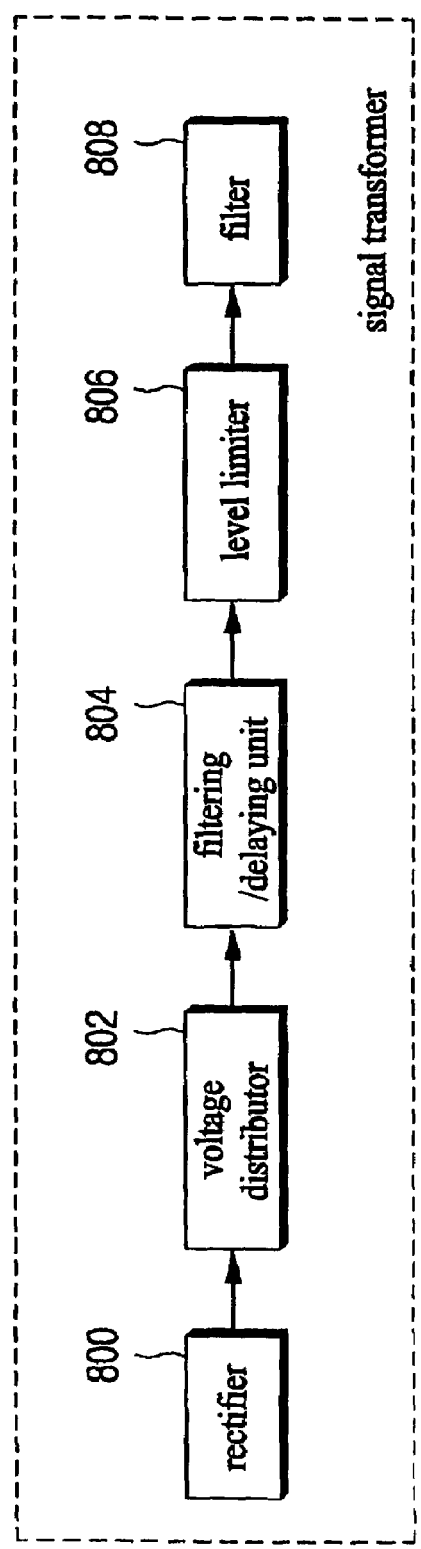
FIG. 8 is a block diagram showing a detailed constitution of a signal transformer in accordance with a preferred embodiment of the present invention.

FIG. 8 is a block diagram showing a detailed constitution of a signal transformer in accordance with a preferred embodiment of the present invention. As shown in FIG. 8, a signal transformer 502 in accordance with an embodiment of the present invention may include a rectifier 800, a voltage distributor 802, a filtering/delaying unit 804, a level limiter 806 and a filter 808. The rectifier 800 implements a function to rectify the current detection signal. In case of shunt method where the magnitude of a signal is measured directly, a rectification process is needed since a current supplied to a load from a source is an alternating current. Also, in case of a current transformer that detects an amount of a current change with the lapse of time, the rectification process is needed since the transformer still outputs an alternating signal. The rectifier 800 may be embodied with a normal diode, and the cases of half and full rectifications can be included into the scope of the rectifier 800.

The voltage distributor 802 implements a function to distribute a voltage outputted from the rectifier 800 in a predetermined ratio. The voltage outputted from the rectifier 800 may be high according to circumstances, and such a signal is to be attenuated since it has an influence on circuit parts. Voltage distribution can be embodied with voltage distribution resistors.

The filtering/delaying unit 804 implements a function to pass a high frequency band of a signal and delay a signal outputted from the filter. The signal outputted from the voltage distributor 802 includes a signal of all frequency bands having a direct component. However, since a low frequency component of the direct component and so on has no relation with an arc, only a signal of a high frequency band passes a high pass filter. Also, since the high pass filter includes a capacitor component, it delays a signal inputted using the capacitor so as not to output an impulse signal.

The level limiter 806, in case that a signal level outputted from the filtering/delaying unit 804 exceeds a predetermined level, implements a function to limit the level of the exceeded signal. The voltage distributor 802 and the filtering/delaying unit 804 attenuate the output signal of the current detector to some extent, but there exists a case that an impulse signal having very high output level is outputted so that the level limiter 806 is to limit an output level of a signal below a predetermined level in order to protect a fixed circuit. In accordance with an embodiment of the present invention, the level limiter 806 may be embodied with a Zener diode. The filter 808 is adapted to operate as a high pass filter that passes a high frequency signal of the output signal of the level limiter 806.

Figure 10:
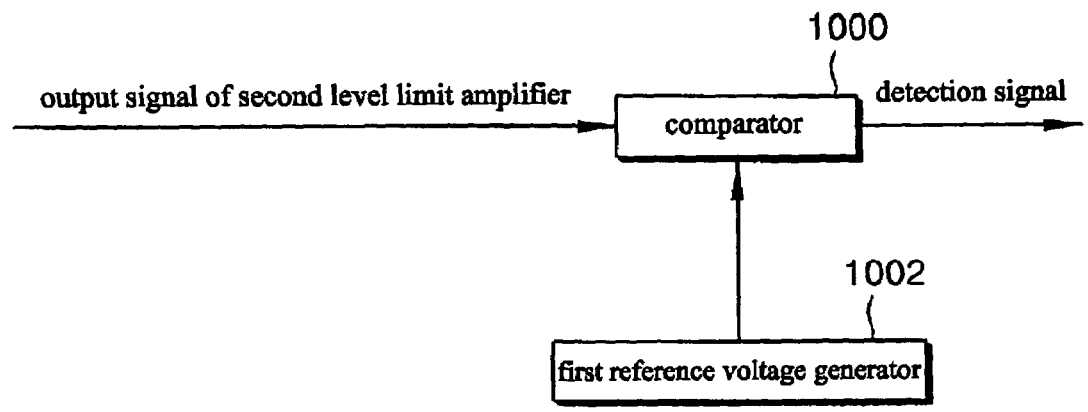
FIG. 10 is a view showing a detailed constitution of a signal level detector in accordance with a preferred embodiment of the present invention.

FIG. 10 is a view showing a detailed constitution of a signal level detector in accordance with a preferred embodiment of the present invention.

As shown in FIG. 10, a signal level detector in accordance with a preferred embodiment of the present invention includes a comparator 1000 and a first reference voltage generator 1002. The first reference voltage generator 1002 implements a function to generate a first reference voltage and input it to the comparator 1000.

The comparator 1000 compares an output signal level of the second level limit amplifier 506 with a signal outputted from the first reference voltage generator 1002. And when the output signal of the second level limit amplifier 506 is higher than the output voltage level of the first reference voltage generator 1002, the comparator outputs a detection signal. As described above, a voltage stabilization circuit may be inserted between the second level limit amplifier 506 and the signal level detector, and the comparator compares an output signal of the voltage stabilization circuit with the first reference voltage in this case. In accordance with an embodiment of the present invention, the comparator can be embodied with an OP amplifier or an Op amplifier integrated circuit, or otherwise it can be embodied with a plurality of transistors. The circuit constitution of the comparator can be changed variously, and those skilled in the art will know that the change does not have any influence on the scope of the present invention.

Since the side signals are amplified sufficiently by the first level limit amplifier 504 and the second level limit amplifier 506, the signal level detector 508 can detect the side signals more precisely.

Figure 11:
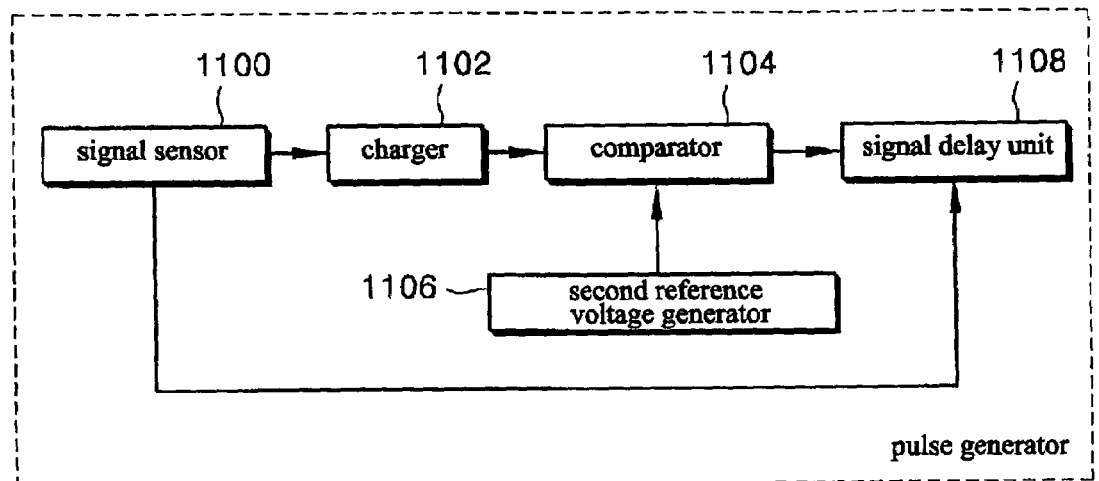
FIG. 11 is a block diagram showing a detailed constitution of a pulse generator in accordance with a preferred embodiment of the present invention.

FIG. 11 is a block diagram showing a detailed constitution of a pulse generator in accordance with a preferred embodiment of the present invention.

As shown in FIG. 11, a pulse generator 510 in accordance with a preferred embodiment of the present invention includes a signal sensor 1100, a charger 1102, a comparator 1104, a second reference voltage generator 1106 and a signal delay unit 1108.

The signal sensor 1100 implements a function to sense whether the signal level detector 508 outputs a detection signal. According to a preferred embodiment of the present invention, the signal sensor 1100 is coupled with an output stage of the signal level detector and determines whether the detection signal exceeds a fixed reference signal level so as to sense the detected signal. When the signal detector 1100 senses an output of the detection signal, it generates the sense signal and inputs it to the charger 1102 and the signal delay unit 1108.

When the signal sensor 1100 outputs the sensed signal, the charger 1102 starts charging. The charger 1102 may be constituted as a resistor and a capacitor constituting a general charging circuit and a power supply providing a charge voltage. The charge voltage is charged in the capacitor, and a charge time depends on the values of the resistor and the capacitor and a magnitude of the voltage. The charge time determines the width of a pulse generated in the pulse generator 510.

When the signal sensor outputs a sensing signal, the signal delay unit 1108 implements a function to delay the sensing signal. That is, when the signal level detector 508 outputs a detection signal and the signal sensor 1100 senses the detection signal, the signal delay unit delays the signal and generates a pulse of square wave. As described above, the signal level detection signal is outputted as a different magnitude and width of signal. When the magnitude and width of the signal is outputted differently, it is difficult to grasp a precise frequency component of the signal. Since the present invention makes use of a characteristic that the arc signal has a higher frequency compared with a signal of dimmer and a signal occurred when starting electric equipment, a pulse having a fixed magnitude and width is generated by delaying the signal in order to the frequency precisely.

The second reference voltage generator 1106 generates a predetermined charge completion voltage and provides it to the comparator 1604. When a voltage changed in the charger 1102 exceeds the charge completion voltage generated in the second reference voltage generator, the comparator 1104 generates an output signal. The comparator 1104 may be embodied using an OP amplifier or a plurality of transistors in the same manner as the comparator of the signal level detector.

The output signal of the comparator 1104 is inputted into the signal delay unit 1108, and the signal delay unit 1108 stops to delay the signal by receiving an output signal of the comparator. That is, the signal delay unit 1108 delays the signal when the signal sensor 1100 senses a signal, and stops to delay the signal when the comparator 1104 generates an output signal so that a square wave pulse is generated. Since the charge time of the charger is fixed, the signal delay unit can always generate a pulse having a fixed width. The charger 1102 stops charging and discharges the charged voltage when the charger receives an output signal of the comparator or it senses that the signal delay unit has stopped the signal delay.

Figure 12:
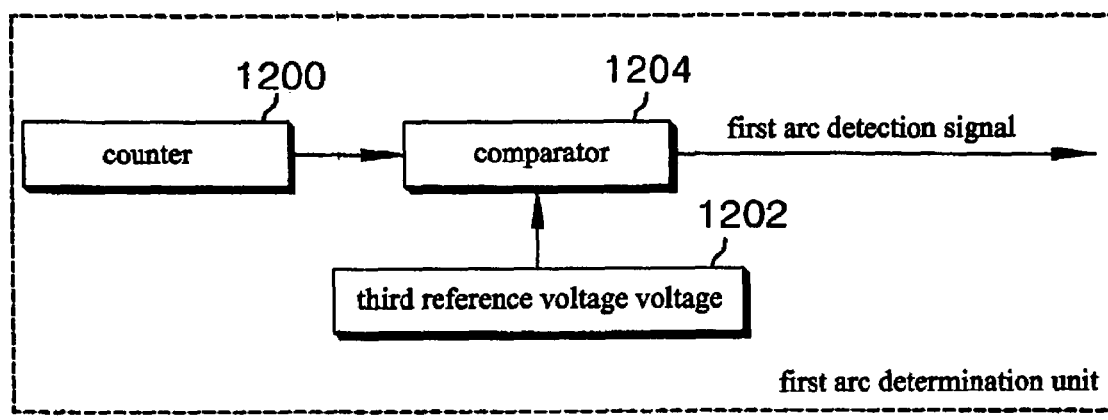
FIG. 12 is a block diagram showing a detailed constitution of a first arc determination unit in accordance with a preferred embodiment of the present invention.

FIG. 12 is a block diagram showing a detailed constitution of a first arc determination unit in accordance with a preferred embodiment of the present invention.

As shown in FIG. 12, a first arc determination unit in accordance with a preferred embodiment of the present invention may include a counter 1200, a third reference voltage generator 1202 and a comparator 1204. The counter 1200 implements a function to count the number of pulses outputted from a pulse generator 510. In accordance with a preferred embodiment of the present invention, the counter 1200 counts the number of the pulses by integrating the pulses outputted from the pulse generator 51 0. The integration of the pulses may be implemented using an integration circuit embodied with a resistor and a capacitor. It is evident to those skilled in the art that other counter may also be used instead of the integration circuit.

The third reference voltage generator 1202 inputs a reference voltage determined to be an arc signal into the comparator 1204. The comparator 1204 compares the integrated voltage in the counter with the third reference voltage outputted from the third reference voltage generator and outputs a first arc detection signal when the former is higher than the latter.

Since the arc signal has more high frequency components compared with the signal of dimmer and the signal occurred when starting electric equipment, the pulse generator generates more pulses when an arc signal is occurred for a predetermined time. Accordingly, when the third reference voltage is established higher than the integrated voltages of pulses of the signal of dimmer or the signal occurred when starting electric equipment, it is possible to detect the arc signal only.

As described above, the first arc detection signal outputted from the comparator 1704 is inputted into the circuit breaker 1012 so that the circuit breaker 1012 breaks a conductive wire connecting the source to the load.

Figure 13:
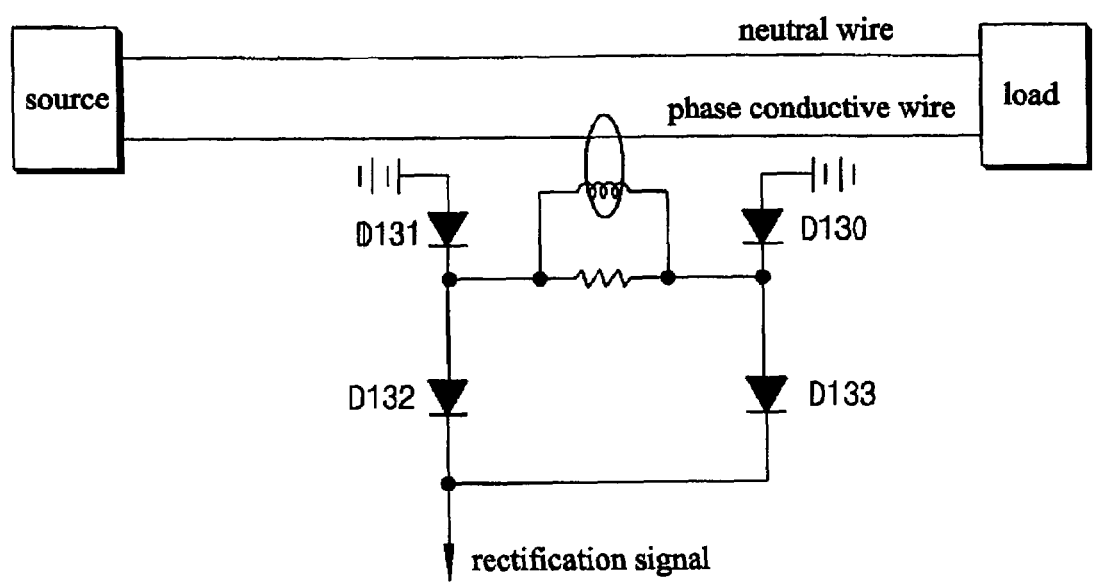
FIG. 13 is a view showing a circuit constitution of a rectifier in accordance with a preferred embodiment of the present invention.

FIG. 13 is a view showing a circuit constitution of a rectifier in accordance with a preferred embodiment of the present invention.

As shown in FIG. 13, a rectifier 800 in accordance with an embodiment of the present invention may be embodied with four diodes D130, D131, D132 and D133. In FIG. 13, D132 and D133 pass a signal having a positive value among an alternating signal, and D131 and D134 convert a signal having a negative value among the alternating signal to a signal having a positive value and implement the full rectification.

Even though FIG. 13 shows an example of the rectifier implementing the full rectification using the four diodes, it is well known to those skilled in the art that a rectifier to implement the half rectification can be embodied using a diode.

Figure 14:
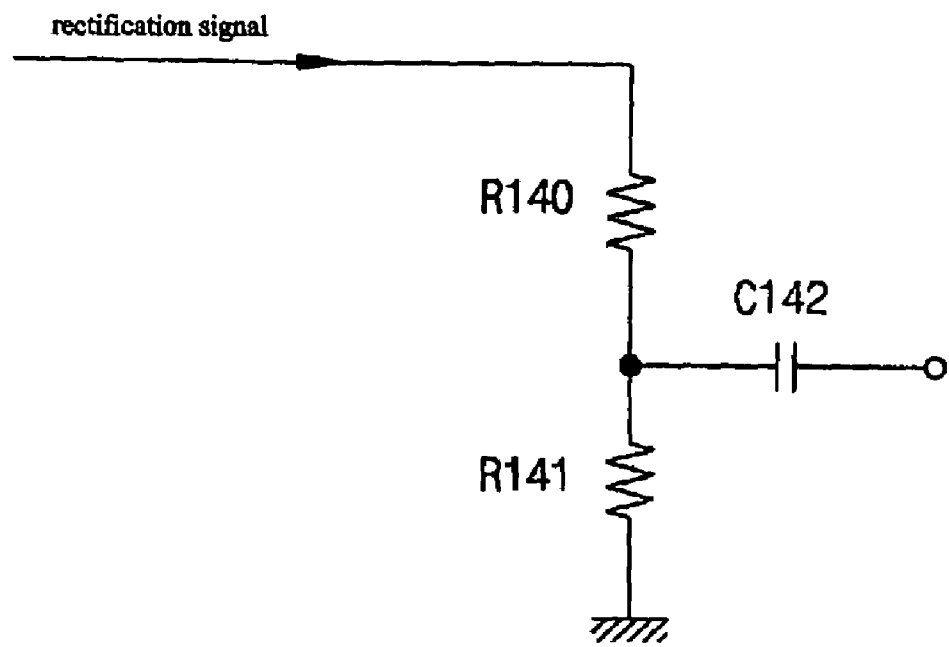
FIG. 14 is a view showing a circuit constitution of a voltage distributor and a filtering/delaying unit in accordance with a preferred embodiment of the present invention.

FIG. 14 is a view showing a circuit constitution of a voltage distributor and a filter/a delay unit in accordance with a preferred embodiment of the present invention.

As shown in FIG. 14, a voltage distributor and a filtering/delaying unit in accordance with an embodiment of the present invention may include two resistors R140 and R141 and a capacitor C142.

In FIG. 14, the two resistors R140 and R141 operate as voltage distributors. Accordingly, the signal outputted from the rectifier 800 is distributed according to the values of the resistors R140 and R141. The resistor R141 and a capacitor C142 implement a function of a filtering/delaying unit. The resistor R141 and the capacitor C142 act as a high pass filter and pass a high frequency signal. The capacitor C142 delays a signal and prevents an excessive impulse from being outputted.

Figure 15:
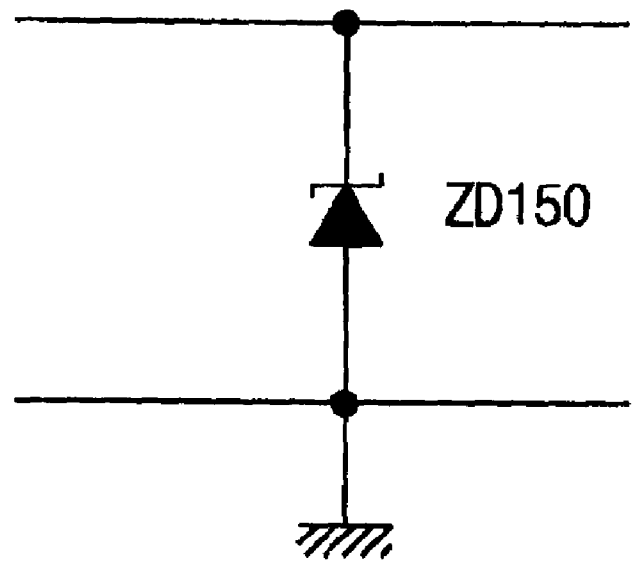
FIG. 15 is a view showing a circuit constitution of a level limiter in accordance with a preferred embodiment of the present invention.

FIG. 15 is a view showing a circuit constitution of a level limiter in accordance with a preferred embodiment of the present invention.

As shown in FIG. 15, a level limiter 806 in accordance with an embodiment of the present invention is embodied as a Zener diode ZD150. The Zener diode ZD150 acts to limit an over voltage to a nominal voltage. For example, in case that a voltage of 25 V is inputted into a Zener diode when a nominal voltage of the Zener diode is 20 V, only 20 V is involved in the Zener diode ZD200. Even though the voltage distributor 802 attenuates a rectified signal in a fixed ratio in order to stabilize the circuit, the level limiter 806 limits a voltage level inputted into the circuit since even the attenuated signal has an influence on the circuit when an excessive impulse is occurred.

Figure 16:
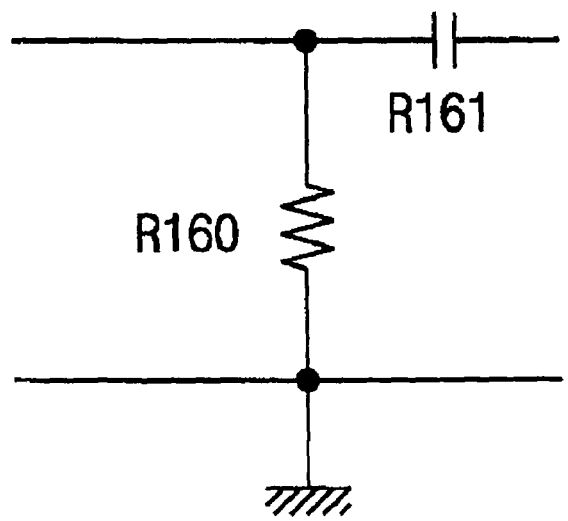
FIG. 16 is a view showing a circuit constitution of a filter in accordance with a preferred embodiment of the present invention.

FIG. 16 is a view showing a circuit constitution of a filter in accordance with a preferred embodiment of the present invention.

As shown in FIG. 16, a filter in accordance with an embodiment of the present invention includes a resistor R160 and a capacitor C161 connected to the resistor in parallel. The circuit shown in FIG. 16 is a high pass filter circuit and passes only a signal which is related to an arc in the signal outputted from the level limiter 806.

Figure 17A:
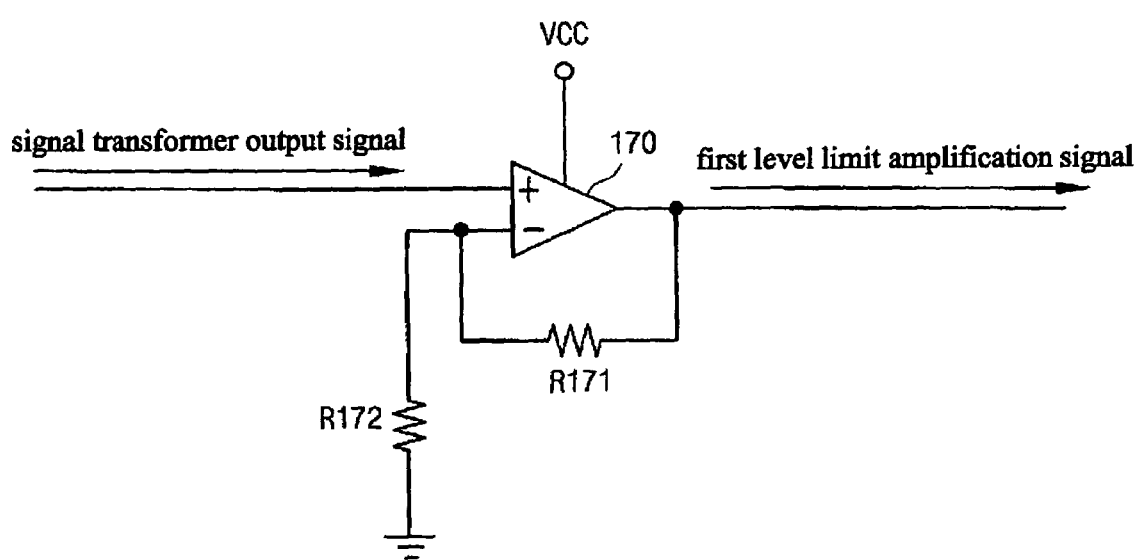
FIG. 17a is a view showing a circuit constitution of a first level limit amplifier in accordance with a preferred embodiment of the present invention.

FIG. 17a is a view showing a circuit constitution of a first level limit amplifier in accordance with a preferred embodiment of the present invention.

As shown in FIG. 17a, a first level limit amplifier in accordance with an embodiment of the present invention may includes an OP amplifier 170, a resistor R171 connected between an output terminal of the OP amplifier 170 and an inverted input terminal of the OP amplifier 170 and a resistor R172 connected between an inverted input terminal of the OP amplifier 170 and the ground.

It is assumed that an output signal of a signal transformer is vi and a first level limit amplification signal is vo. Here, a relation such as an Expression 1 is formed in the circuit shown in FIG. 17a.

$$v_o = v_i + \left(\frac{v_i}{R_{172}}\right) R_{171} \quad \text{(Expression 1)}$$

Accordingly, the ratio of an output signal of the signal transformer and the first level limit signal is expressed as an Expression 2 below.

$$\frac{v_o}{v_i} = 1 + \frac{R_{171}}{R_{172}} \quad \text{(Expression 2)}$$

Accordingly, the first level limit amplifier outputs $$\left(1 + \frac{R_{171}}{R_{172}}\right)$$

times amplified signal of the signal transformation output signal.

Also, since the signal is amplified through the OP amplifier 170, the first level limit amplifier does not amplify the signal above a bias voltage Vcc.

Figure 17B:
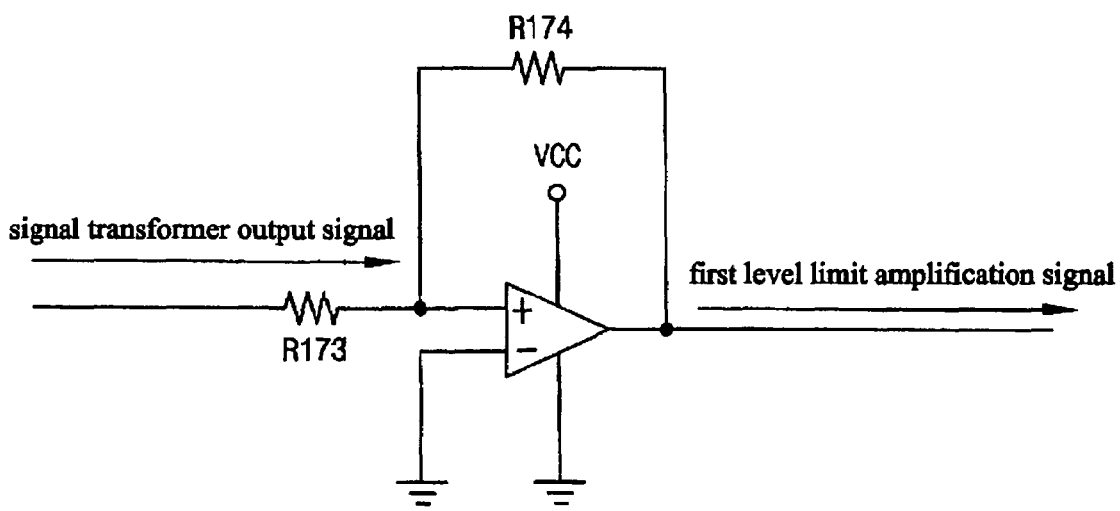
FIG. 17b is a view showing a circuit constitution of a first level limit amplifier in accordance with a preferred embodiment of the present invention.

FIG. 17b is a view showing a circuit constitution of a first level limit amplifier in accordance with another embodiment of the present invention.

As shown in FIG. 17b, a first level limit amplifier in accordance with another embodiment of the present invention may include an OP amplifier, a resistor R174 connected between an output terminal and a non-inverted input terminal of the OP amplifier and a resistor R173 connected to a non-inverted input terminal of the OP amplifier.

The first level limit amplification circuit shown in FIG. 17a is a circuit in which an output voltage is amplified in a non-inverted state, and the first level limit amplification circuit shown in FIG. 17b is a circuit in which an output voltage is amplified in an inverted state.

It is assumed that an output signal of a signal transformer is vi, and a level limit amplification signal is vo. Here, the relation between the vi and vo of the circuit shown in FIG. 17b is formed as the Expression 3 as follows.

$$\frac{v_o}{v_i} = -\frac{R_{174}}{R_{173}} \quad \text{(Expression 3)}$$

Accordingly, the level limit amplifier shown in FIG. 17b amplifies the signal transformation output signal $$\frac{R_{174}}{R_{173}}$$

times and outputs a phase-inverted signal.

Figure 9A:
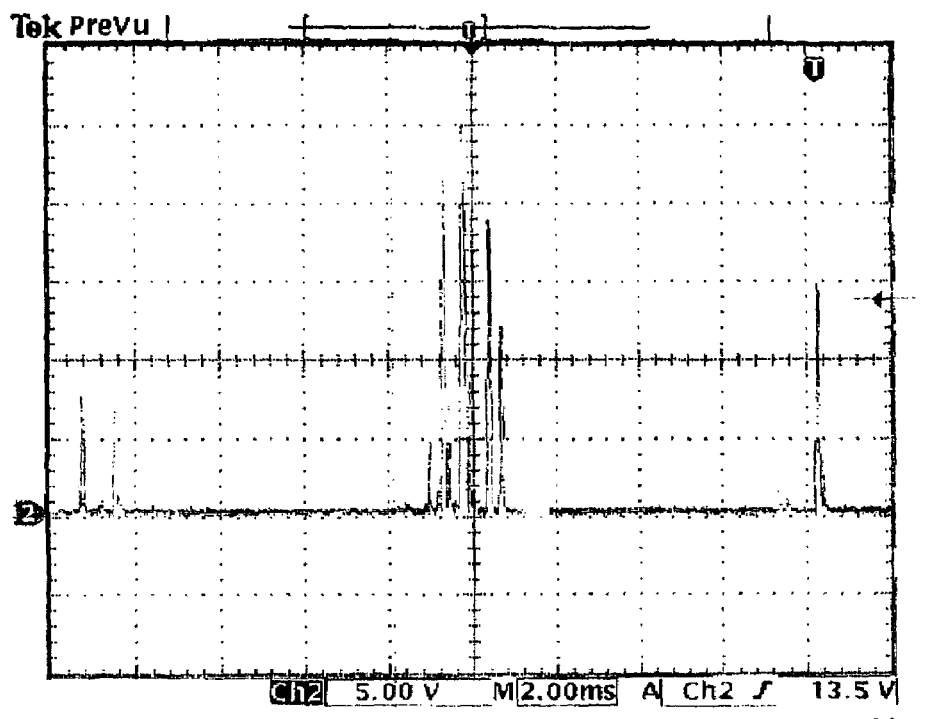
FIG. 9*a* is a view of an example of an arc signal waveform outputted from a first level limit amplifier.
Figure 9B:
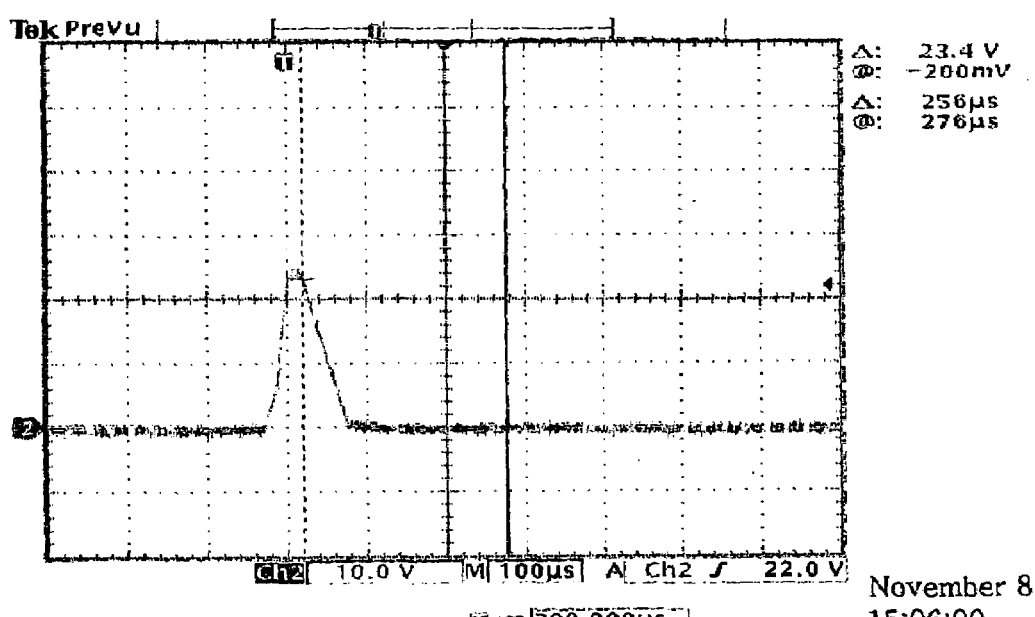
FIG. 9*b* is a view of an example of a signal waveform of a dimmer outputted from a first level limit amplifier.
Figure 9C:
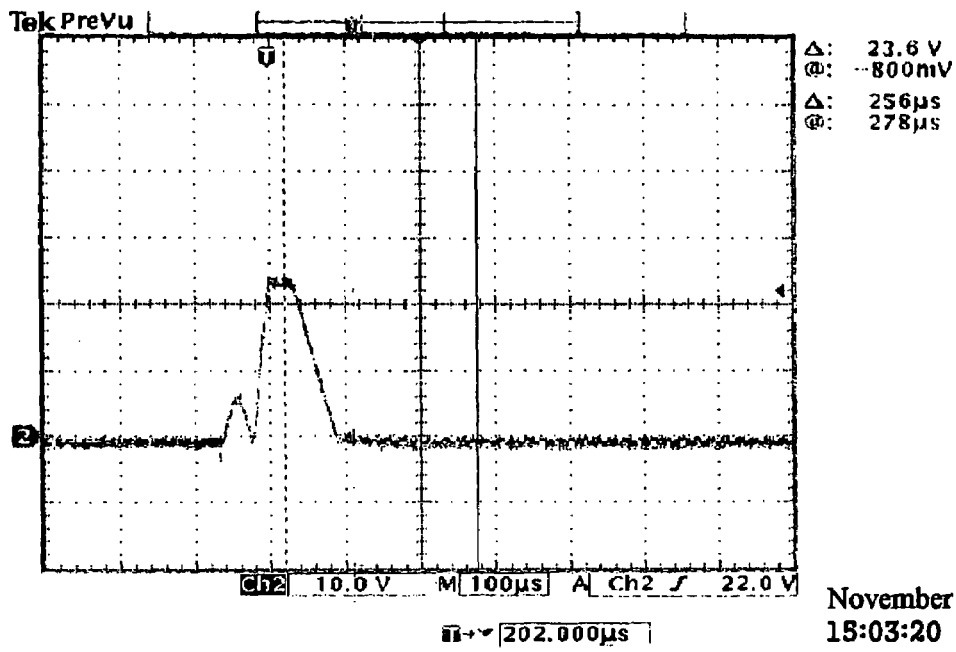
FIG. 9*c* is a view of an example of an signal waveform occurred when starting electric equipment outputted from a first level limit amplifier.
Figure 9D:
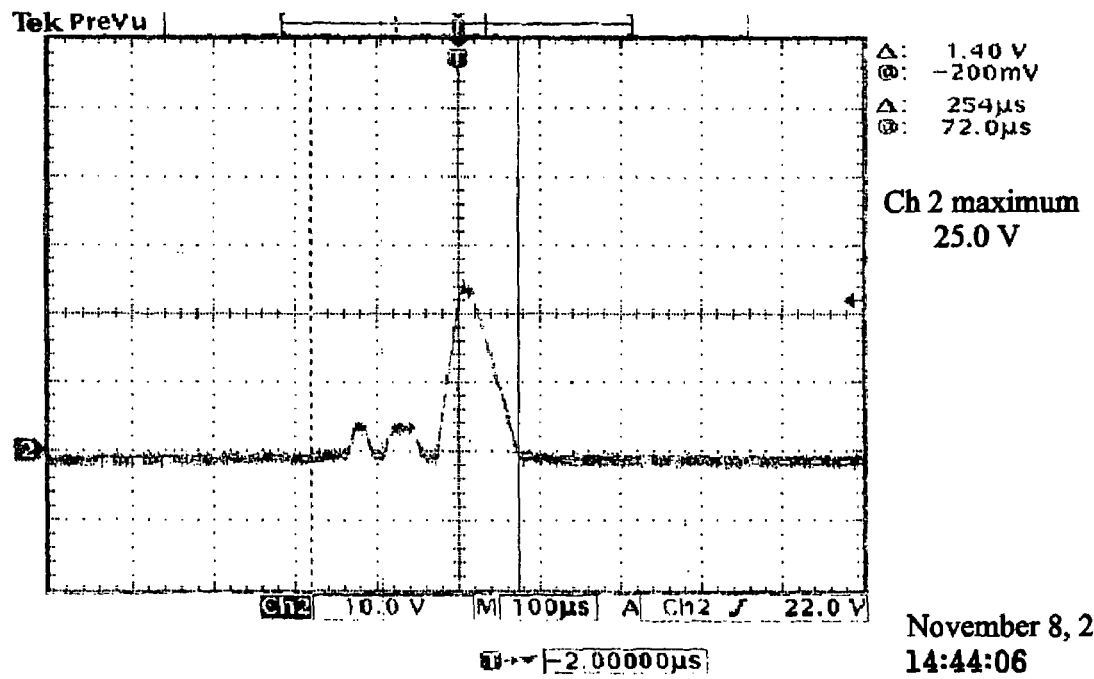
FIG. 9*d* is a view of an example of an normal signal waveform outputted from a first level limit amplifier.

FIG. 9a is a view of an example of an arc signal waveform outputted from a first level limit amplifier, FIG. 9b is a view of an example of a signal waveform of a dimmer outputted from a first level limit amplifier, FIG. 9c is a view of an example of an signal waveform occurred when starting electric equipment outputted from a first level limit amplifier, and FIG. 9d is a view of an example of an normal signal waveform outputted from a first level limit amplifier.

As shown in FIGS. 9a to 9d, since the amplification is implemented after limiting the level of the signal, amplitudes of all signals are outputted to be similar. However, in case of an arc signal, since its side signals are amplified sufficiently, the arc signal is determined to be a high frequency signal and signals other than arc signal are confirmed to be signals having frequencies lower than those of the arc signal.

Figure 18A:
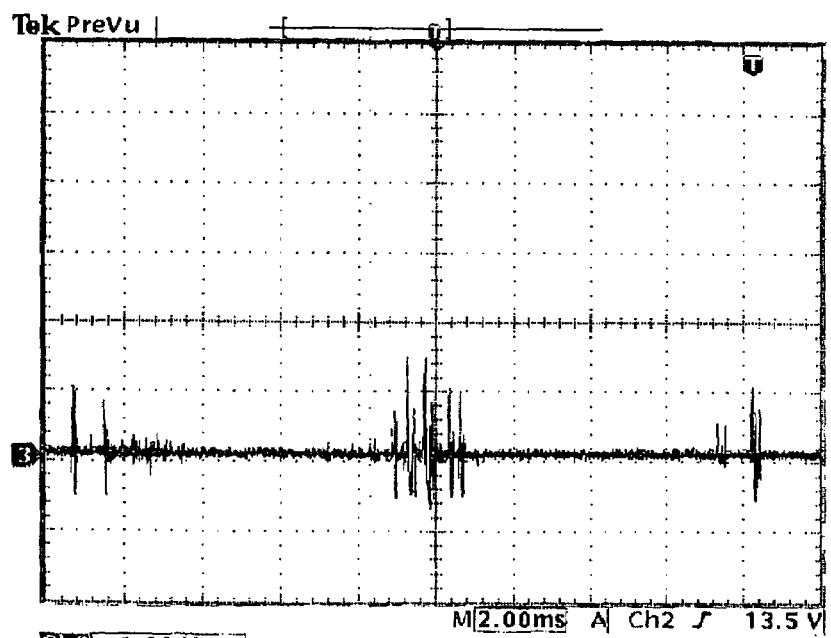
FIG. 18a is a view showing an example of an arc signal waveform outputted from a high pass filter.
Figure 18B:
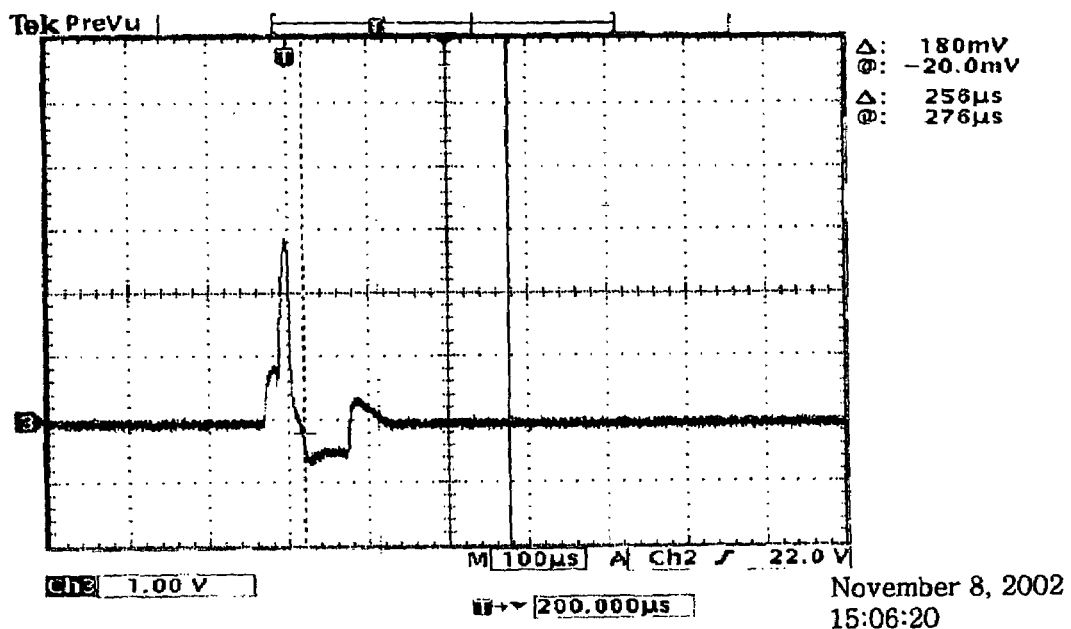
FIG. 18b is a view showing an example of an signal waveform of a dimmer outputted from a high pass filter.
Figure 18C:
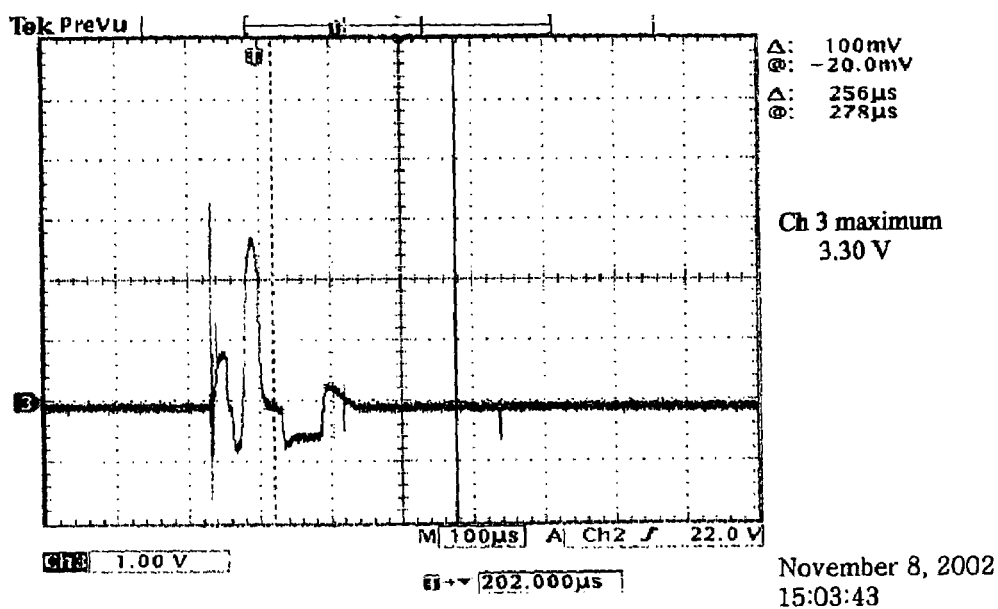
FIG. 18c is a view showing an example of an signal waveform when starting electric equipment outputted from a high pass filter.
Figure 18D:
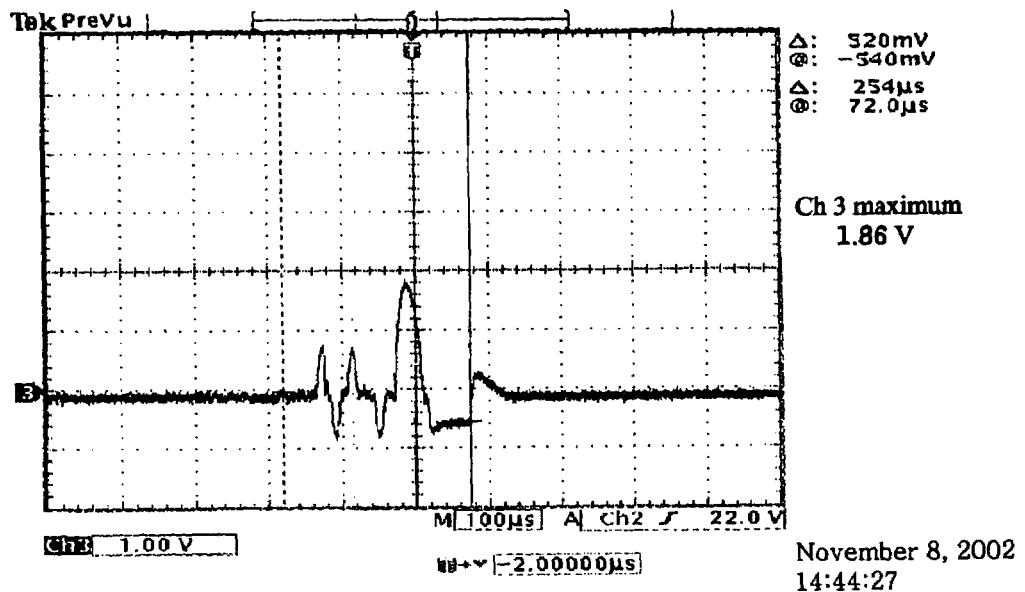
FIG. 18d is a view showing an example of a normal signal waveform outputted from a high pass filter.

FIG. 18a is a view showing an example of an arc signal waveform outputted from a high pass filter, FIG. 18b is a view showing an example of an signal waveform of a dimmer outputted from a high pass filter, FIG. 18c is a view showing an example of an signal waveform when starting electric equipment outputted from a high pass filter, and FIG. 18d is a view showing an example of a normal signal waveform outputted from a high pass filter.

As shown in FIGS. 18a to 18d, it is confirmed that when signals pass a high pass filter, the signal levels attenuate due to the voltage distribution and the removal of a low frequency component.

Figure 19:
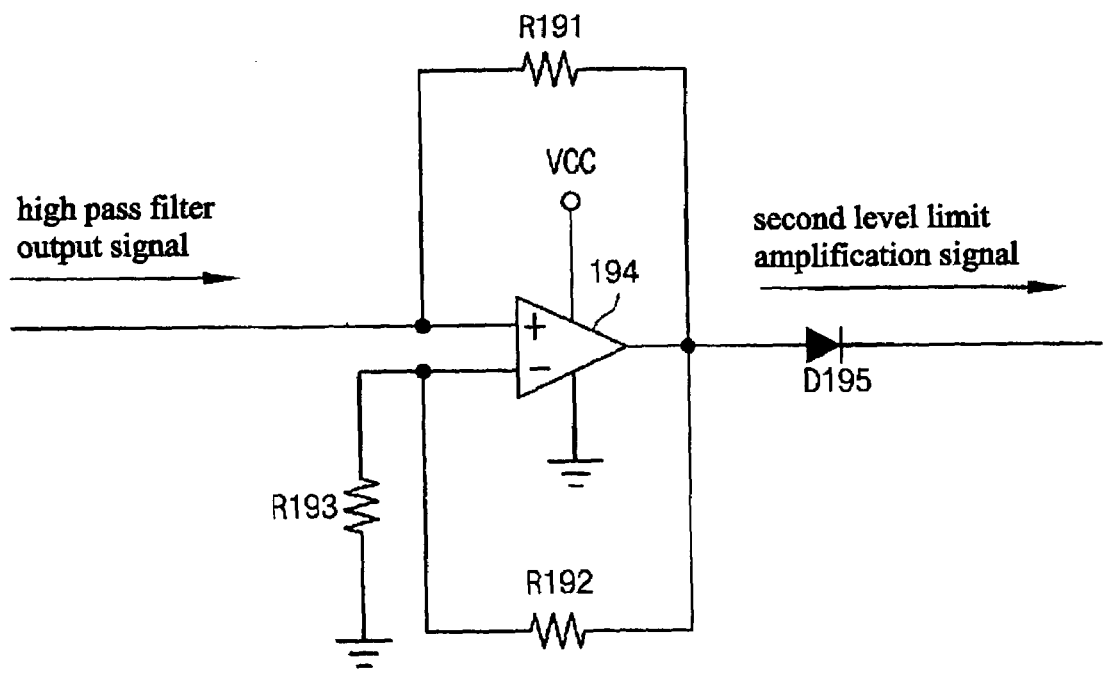
FIG. 19 is a view showing a circuit constitution of a second level limit amplifier in accordance with a preferred embodiment of the present invention.

FIG. 19 is a view showing a circuit constitution of a second level limit amplifier in accordance with a preferred embodiment of the present invention.

As shown in FIG. 19, a second level limit amplifier in accordance with a preferred embodiment of the present invention may include an OP amplifier 194, a resistor R191 connected between an output and a non-inverted input terminal of the OP amplifier 194, a resistor R192 connected between the output and an inverted input terminal of the OP amplifier 194, and a resistor R193 connected between the inverted input terminal of the OP amplifier 194 and the ground.

In FIG. 19, an output signal of a high pass filter is inputted into an OP amplifier 104, and the OP amplifier 194 amplifiers an output signal of the high pass filter having an input signal with an amplification ratio of $$1 + \frac{R_{192}}{R_{193}}.$$

Though an output signal of a first level limit amplifier 504 is positive, a negative signal may be outputted while the output signal of the first level limit amplifier passes through a high pass filter. At this time, the OP amplifier 194 also implements an amplifying operation for a negative signal. The amplification ratio of the negative signal is decided by an impedance viewed from a resistor R191 and a non-inverted input terminal.

A capacitor may be used instead of the resistor R191. In the case that the capacitor is used, a noise may be removed using a second level limit amplifier.

Figure 20A:
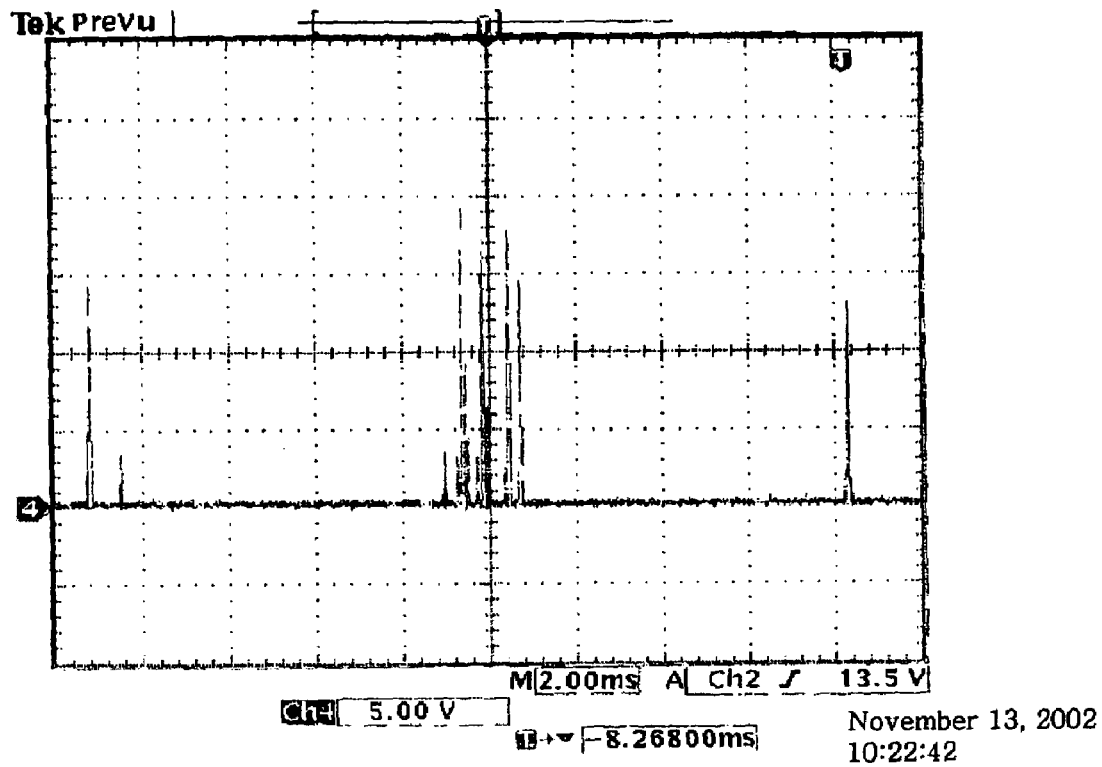
FIG. 20a is a view showing an example of an arc signal waveform outputted from a second level limit amplifier.
Figure 20B:
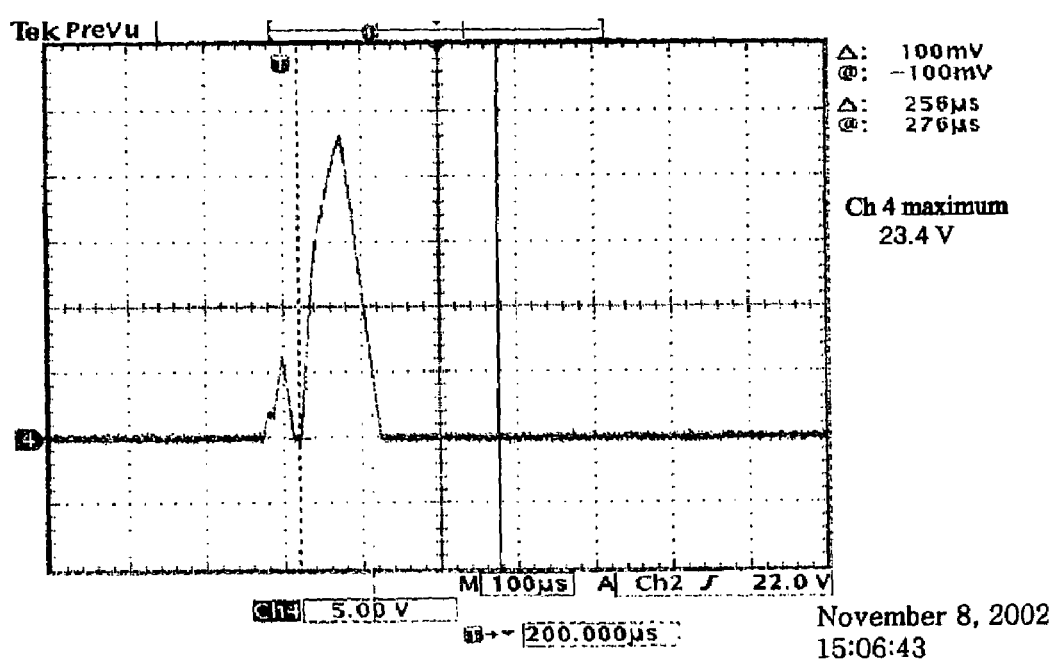
FIG. 20b is a view showing an example of a signal waveform of a dimmer outputted from a second level limit amplifier.
Figure 20C:
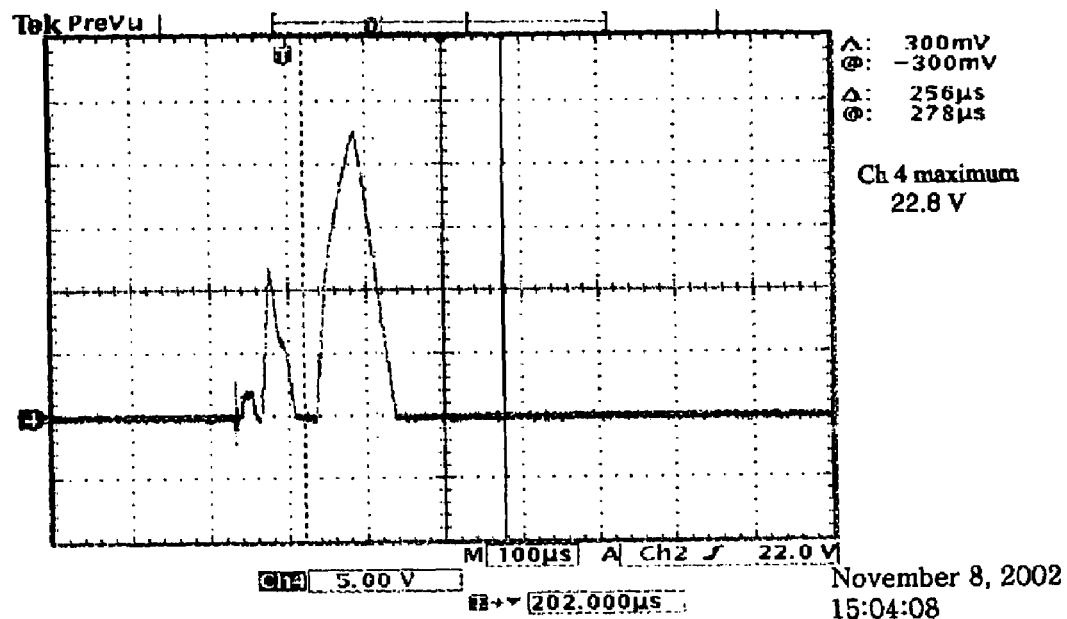
FIG. 20c is a view showing an example of an signal waveform occurred when starting electric equipment outputted from a second level limit amplifier.
Figure 20D:
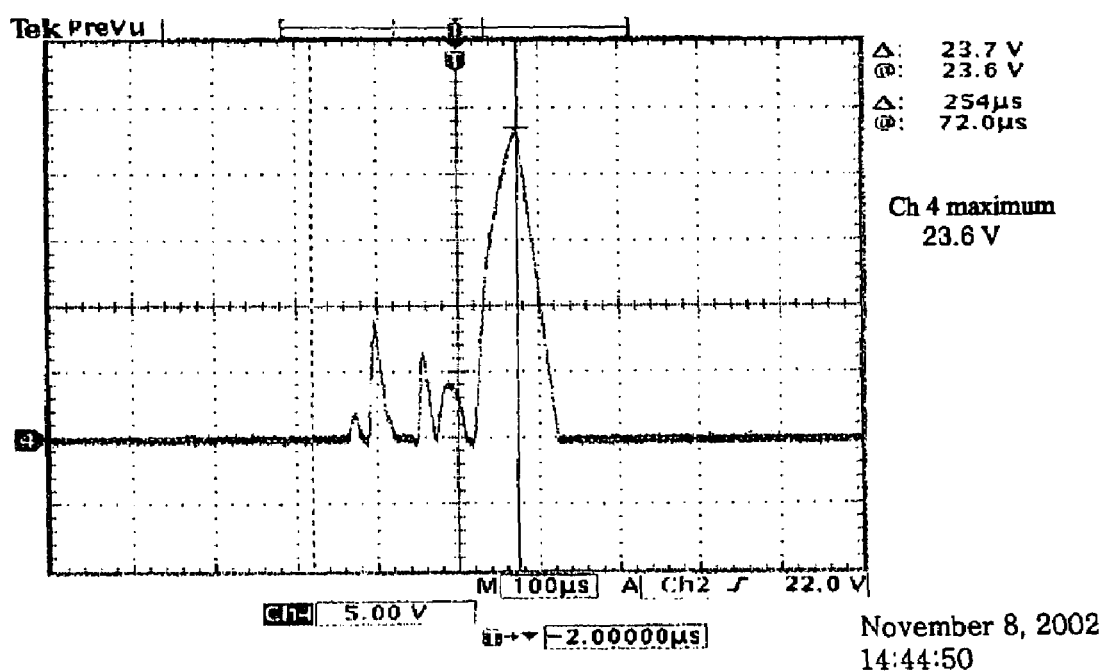
FIG. 20d is a view showing an example of a normal signal waveform outputted from a second level limit amplifier.

FIG. 20a is a view showing an example of an arc signal waveform outputted from a second level limit amplifier; FIG. 20b is a view showing an example of a signal waveform of a dimmer outputted from a second level limit amplifier; FIG. 20c is a view showing an example of an signal waveform occurred when starting electric equipment outputted from a second level limit amplifier; and FIG. 20d is a view showing an example of a normal signal waveform outputted from a second level limit amplifier.

As shown in FIGS. 20a to 20d, both positive and negative signals of output signals from the high pass filter are amplified using a second level limit amplifier. Also, a difference of amplitude between the main signal and the side signal becomes smaller through two amplifications. Accordingly, it becomes clearer that the arc signal is a high frequency signal compared with other signals.

Figure 21:
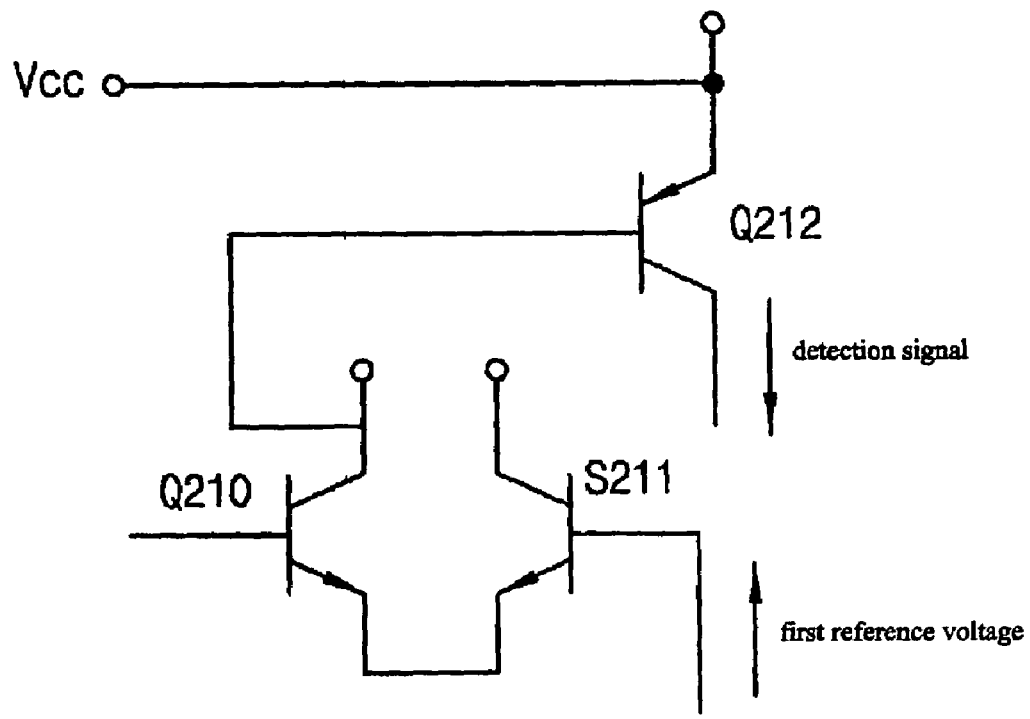
FIG. 21 is a view showing a circuit constitution of a signal level detector in accordance with a preferred embodiment of the present invention.

FIG. 21 is a view showing a circuit constitution of a signal level detector in accordance with a preferred embodiment of the present invention.

As shown in FIG. 21, a signal level detector in accordance with an embodiment of the present invention may include three transistors Q210, Q211 and Q212. An output signal of a second level limit amplifier is inputted into a base terminal of the transistor Q210. The circuit shown in FIG. 21 is a common emitter circuit in which emitters of the transistors Q210 and Q211 are connected, and a first reference voltage signal in inputted into a base terminal of the transistor Q210.

In case that an output signal level of the second level limit amplifier is higher than the first reference voltage, the base voltage of the transistor Q210 is higher than the emitter voltage so that the transistor Q212 turns on. When the transistor Q210 turns on, an output signal of the transistor Q210 is inputted into the base of the transistor Q212. When the output signal is inputted into the base of the transistor Q212, the transistor Q212 turns on and a collector of the transistor Q212 generates a detection signal. In case that an output signal level of the second level limit amplifier is lower than the first reference voltage, since a base voltage of the transistor Q210 is not higher than an emitter voltage of it, the transistor Q212 does not turn on, and the collector of the transistor Q212 does not output the detection signal.

Figure 22:
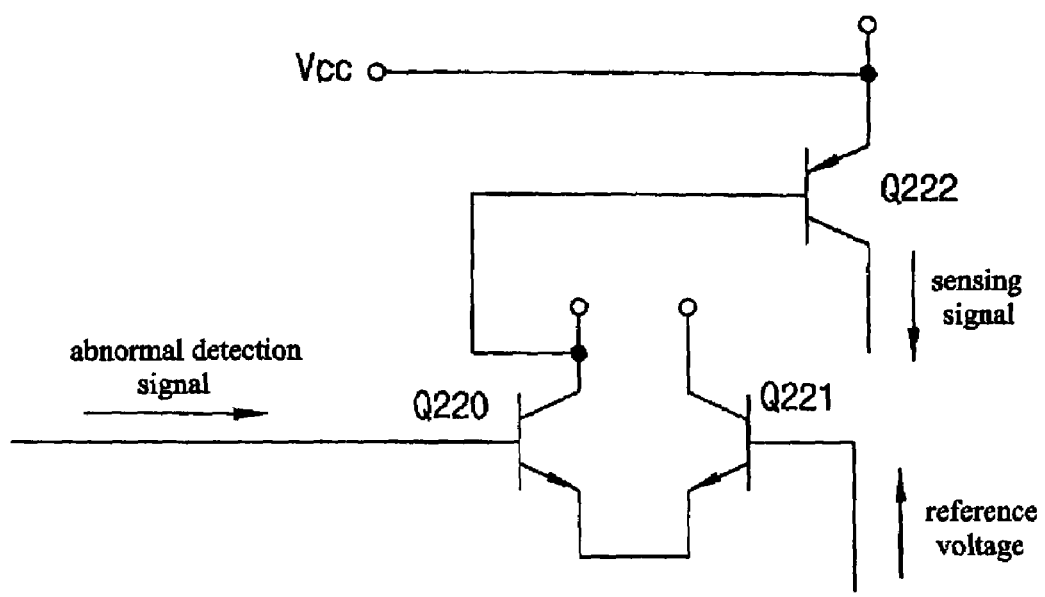
FIG. 22 is a view showing a circuit constitution of a signal sensor of a pulse generator in accordance with a preferred embodiment of the present invention.

FIG. 22 is a view showing a circuit constitution of a signal sensor of a pulse generator in accordance with a preferred embodiment of the present invention.

As shown in FIG. 22, a signal sensor in accordance with an embodiment of the present invention may include three transistors Q220, Q221 and Q212.

A circuit shown in FIG. 22 is coupled with a signal level detector and senses a detected signal by determining whether a detection signal exceeds a predetermined reference voltage. The detection signal is inputted into a base terminal of a transistor Q220, a reference voltage is inputted into a base terminal of a transistor Q221, and emitters of both transistors Q220 and Q221 are connected. In case that a signal inputted into a base terminal of the transistor Q220 is a normal detection signal, the output level of it is higher than that of the reference voltage. Accordingly, when the normal detection signal is inputted, the base voltage of the transistor Q220 is higher than the emitter voltage of it so that the transistor Q220 turns on.

When the transistor Q220 turns on, an output signal of the transistor Q220 is inputted into a base of the transistor Q222. When the output signal is inputted into the base of the transistor Q222, the transistor Q222 turns on, and the output signal of the transistor Q222 outputs a sensing signal.

Figure 23:
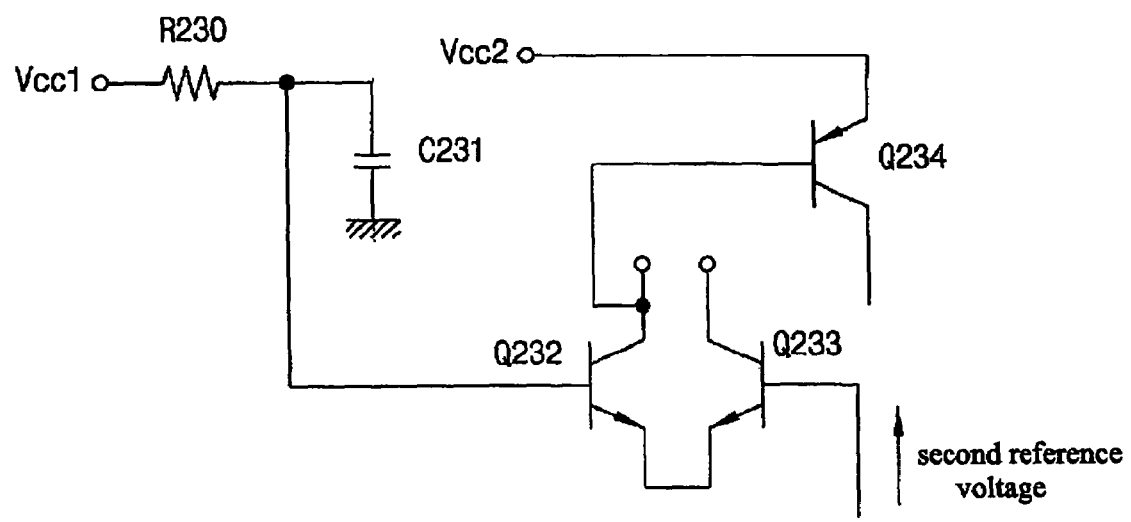
FIG. 23 is a view showing a circuit constitution of a charger and a comparator of a pulse generator in accordance with a preferred embodiment of the present invention.

FIG. 23 is a view showing a circuit constitution of a charger and a comparator of a pulse generator in accordance with a preferred embodiment of the present invention.

In FIG. 23, a bias voltage Vcc1, a resistor R230 and a capacitor C231 constitute a charger and three transistors Q232, Q233 and Q234 constitute a comparator. When the signal sensor outputs a sensing signal, the capacitor C231 of the charger is charged by the bias voltage Vcc1. The charged voltage in the capacitor C231 is inputted into the base of the transistor and a second reference voltage is inputted into the base of the transistor Q223.

When a voltage charged in the capacitor C231 exceeds the second reference voltage, the transistor Q232 turns on. When the transistor Q232 turns on, the output signal of the transistor Q232 is inputted into a base of the transistor Q234 and the transistor Q234 turns on. When the transistor Q234 turns on, a collector of the transistor Q234 generates a charge completion signal and the charge completion signal is inputted into a signal delay unit 1108.

Figure 24:
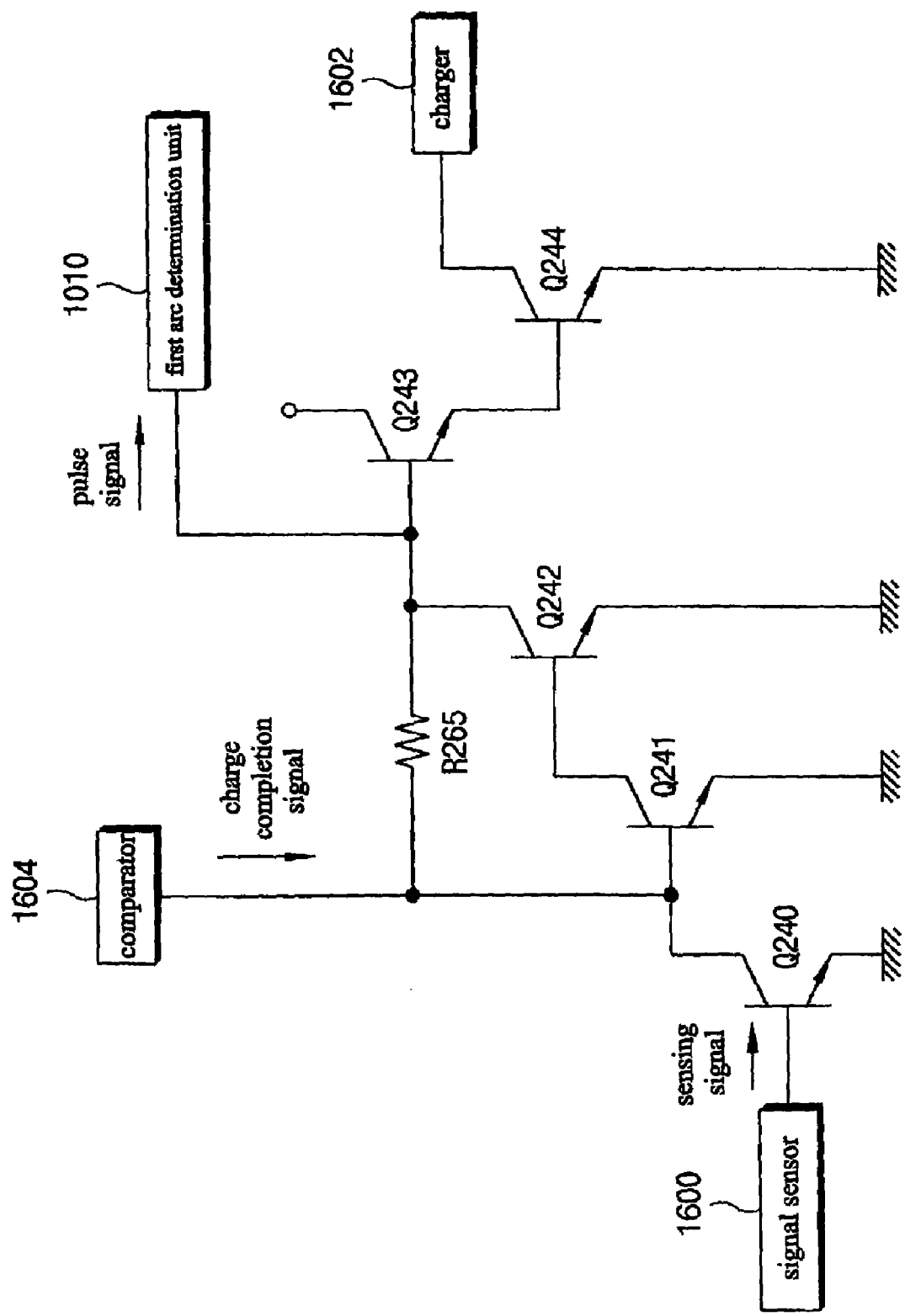
FIG. 24 is a view showing a circuit constitution of a signal delay unit of a pulse generator in accordance with a preferred embodiment of the present invention.

FIG. 24 is a view showing a circuit constitution of a signal delay unit of a pulse generator in accordance with a preferred embodiment of the present invention.

In FIG. 24, a sense signal outputted from a signal sensor 1100 is inputted into a base of a transistor Q240. When the sense signal is inputted into the base of the transistor Q240, the transistor Q240 turns on. When the transistor Q240 turns on, a transistor Q241 turns off, and accordingly a transistor Q242 turns on.

As shown in FIG. 24, a collector of the transistor Q242 is connected to a base of the transistor Q241 through a resistor R245. That is, an output of the transistor Q242 is connected to an input of the transistor Q241 again. Accordingly, once a sense signal is outputted and the transistor Q242 turns on, the transistor Q242 continues to generate an output of high state.

After the sense signal is outputted, since a comparator 1104 generates the charge completion signal every fixed constant time interval, the transistor Q242 always generates pulses having a fixed width and magnitude. The pulse signal outputted from the transistor Q242 is inputted into an arc determination unit 512. When a charge completion signal is inputted from the comparator 1104, the transistor Q244 turns on, and a collector of the transistor Q244 is connected to a capacitor of the charger 1102. Accordingly, when the transistor Q244 turns on, the capacitor of the charger 1102 is connected to the ground and discharged. So, when a charge is completed, a charge voltage of the charger is discharged again. When a new sense signal is outputted, the comparator generates the charge completion signal every fixed constant time interval.

Figure 25:
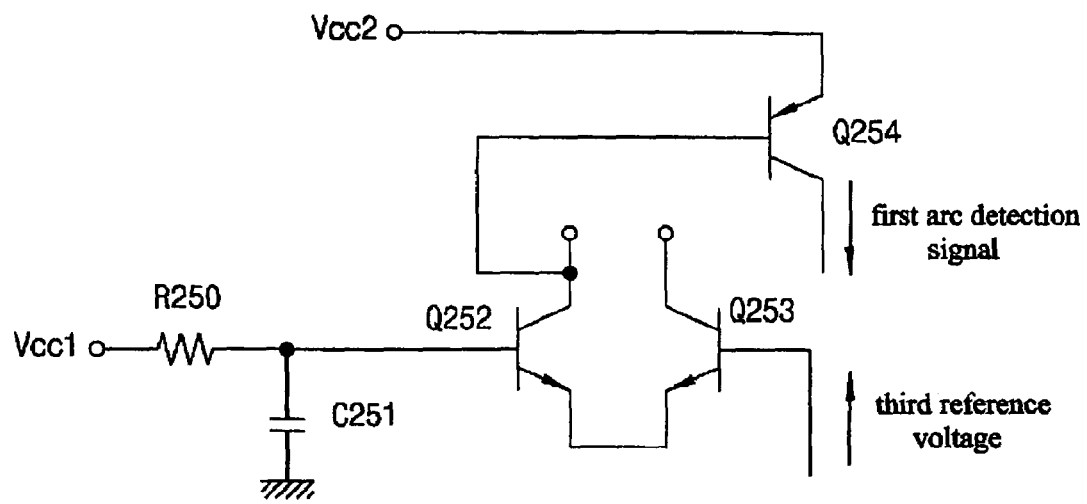
FIG. 25 is a view showing a circuit constitution of a first arc determination unit in accordance with a preferred embodiment of the present invention.

FIG. 25 is a view showing a circuit constitution of a first arc determination unit in accordance with a preferred embodiment of the present invention.

In FIG. 25, a counter 1200 is consisted of a resistor R250 and a capacitor C251, and a comparator 1204 is consisted of three transistors Q252, Q253 and Q254. A pulse signal outputted from the pulse generator is inputted into a capacitor C251 through a resistor R250 and the capacitor C251 integrates an output pulse signal. As described above, in case that an arc is occurred, since a higher frequency signal is outputted compared with the cases that the dimmer is used or electric equipment is started, more pulses are outputted from a pulse generator and a higher voltage is integrated in the capacitor C251. A voltage integrated in the capacitor C251 is inputted into the transistor Q252, and a third reference voltage is inputted into a base of the transistor Q253.

In case that a voltage charged in the capacitor C253 exceeds the third reference voltage, the transistor Q252 turns on and an output signal of the transistor Q252 is inputted into the transistor Q254. When an output signal of transistor Q252 is inputted into the base of the transistor Q254, the transistor Q254 turns on and a collector of the transistor Q254 outputs a second arc detection signal. The arc detection signal is inputted into a circuit breaker 514 and the circuit breaker 514 stops transmitting of power from a source to a load by breaking a phase conductive wire.

Figure 27A:
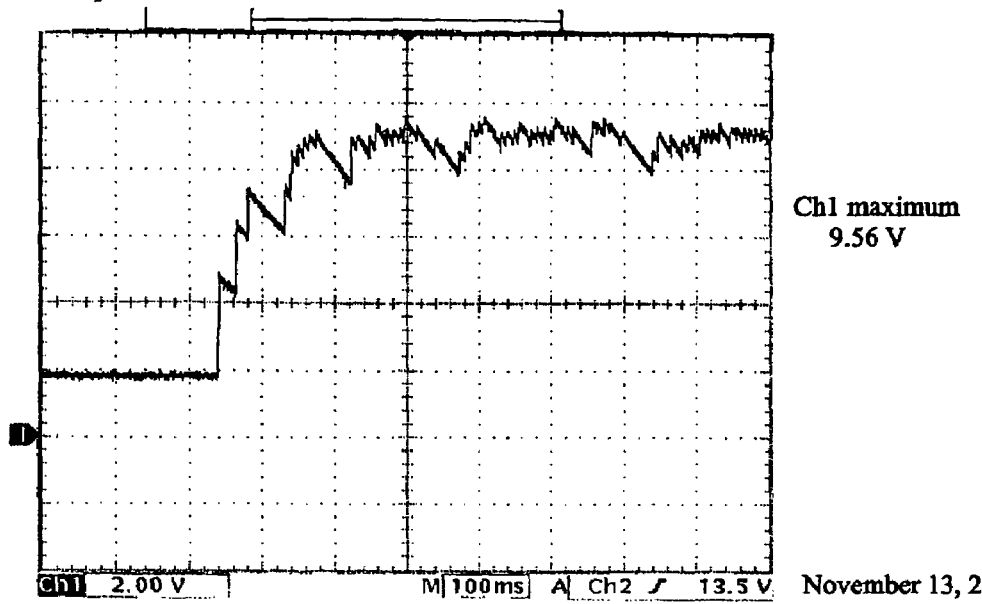
FIG. 27a is a view showing a waveform of a signal integrated in a counter in case that an arc is occurred.
Figure 27B:
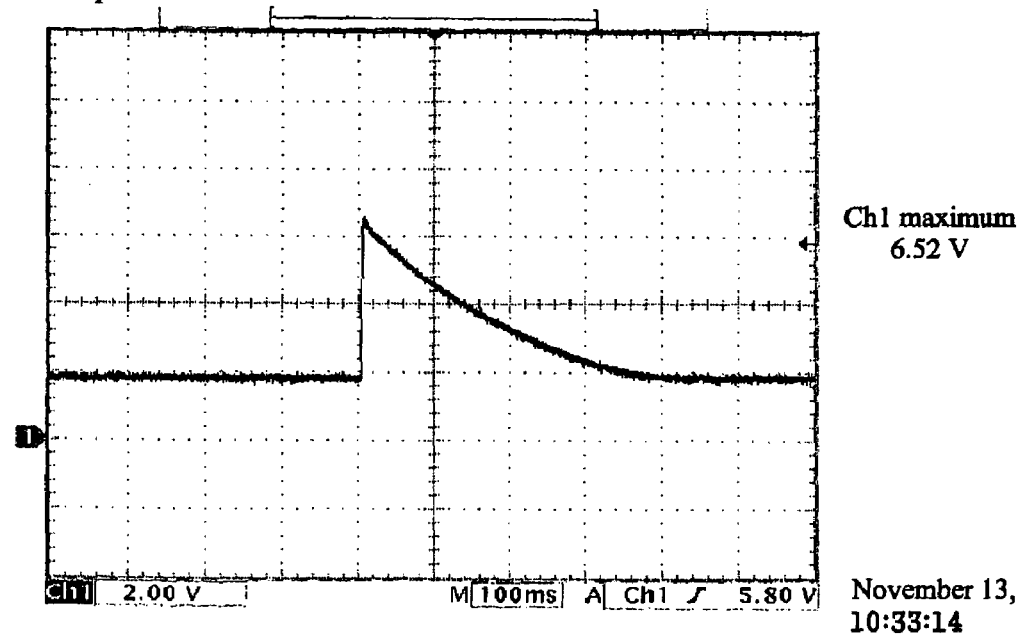
FIG. 27b is a view showing a waveform of a signal integrated in a counter in case that a dimmer is used.
Figure 27C:
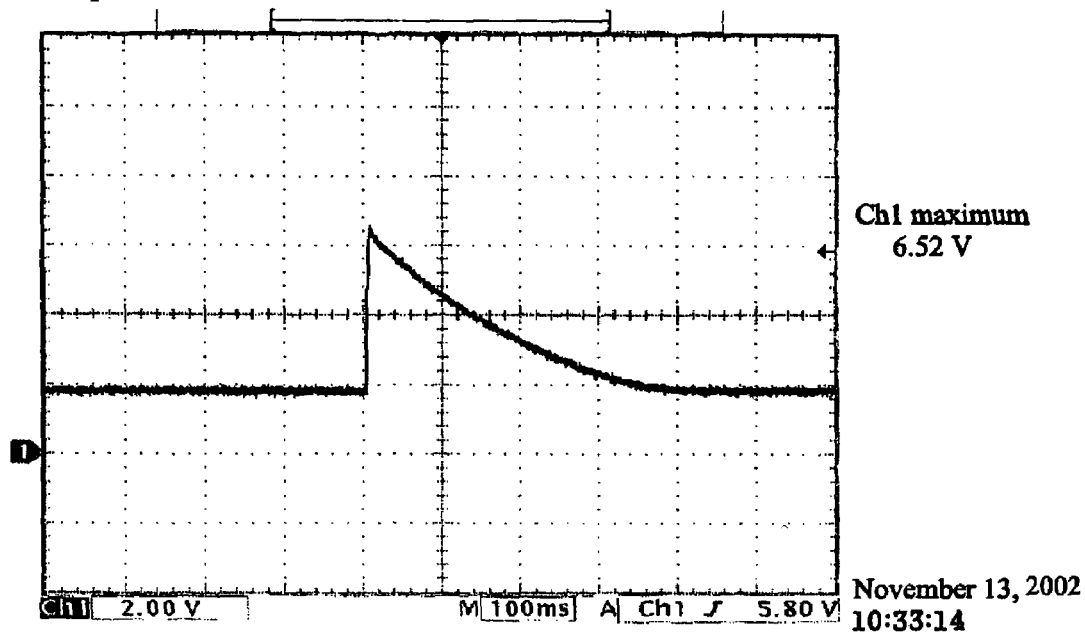
FIG. 27c is a view showing a waveform of a signal integrated in a counter when starting electric equipment.
Figure 27D:
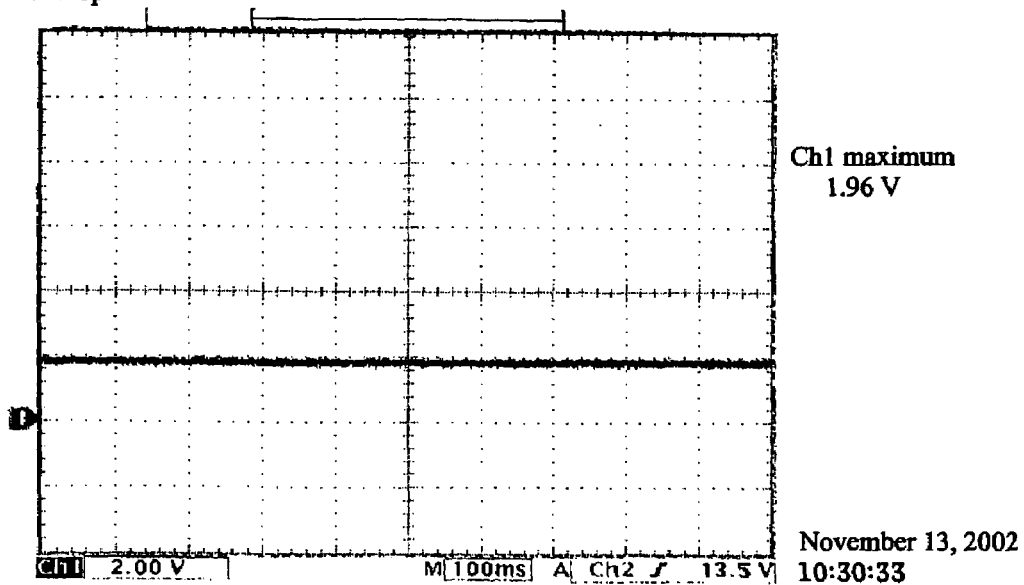
FIG. 27d is a view showing a waveform of a signal integrated in a counter in a normal state.

FIG. 27a is a view showing a waveform of a signal integrated in a counter in case that an arc is occurred; FIG. 27b is a view showing a waveform of a signal integrated in a counter in case that a dimmer is used; FIG. 27c is a view showing a waveform of a signal integrated in a counter when starting electric equipment; and FIG. 27d is a view showing a waveform of a signal integrated in a counter in a normal state.

As shown in FIGS. 27a to 27d, it is confirmed that a higher voltage is integrated in the counter when an arc is occurred rather than signal of dimmer and a signal occurred when starting electric equipment.

Figure 26:
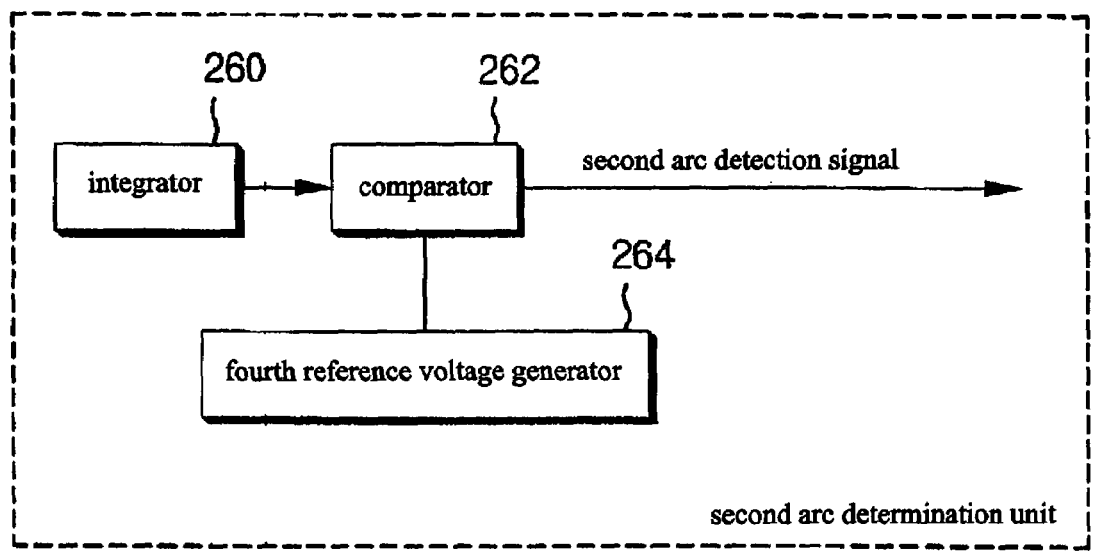
FIG. 26 is a view showing a constitution of a second arc determination unit in accordance with a preferred embodiment of the present invention.

FIG. 26 is a view showing a constitution of a second arc determination unit in accordance with a preferred embodiment of the present invention.

As shown in FIG. 26, a first arc determination unit in accordance with an embodiment of the present invention may include an integrator 260, a comparator 262 and a fourth reference voltage generator 264.

The first arc determination unit acts to sense a parallel arc, which occurs when a metallic material comes into contact with the wire, for example, driving a nail into a wall having wires therein. Such a parallel arc signal is occurred instantaneously and generates a signal of very high magnitude.

Accordingly, whether the instantaneous are is occurred is determined not by analyzing a frequency component as is in a normal arc described above, but by analyzing a magnitude of signal.

In FIG. 26, an integrator 260 acts to integrate a signal outputted from the second level limit amplifier 506. In accordance with a preferred embodiment of the present invention, the integrator may be embodied with an integration circuit consisted of a resistor and a capacitor as is in the counter of the second arc determination unit, and it is desirable to integrate a signal for a short time only by shortening a RC constant value of the integrator.

A fourth reference voltage generator 264 provides a reference voltage to determine an instantaneous voltage to a comparator. The comparator 262 compares a voltage provided from the fourth reference voltage generator with a voltage integrated in the integrator 260, and outputs a first arc detection signal when the integrated voltage is higher than the voltage from the fourth reference voltage generator. Since circuit constitutions of the integrator 260 and the comparator 262 are embodied in similar methods as in the counter and the comparator of the second arc determination unit, a detailed description for them is omitted.

Figure 28:
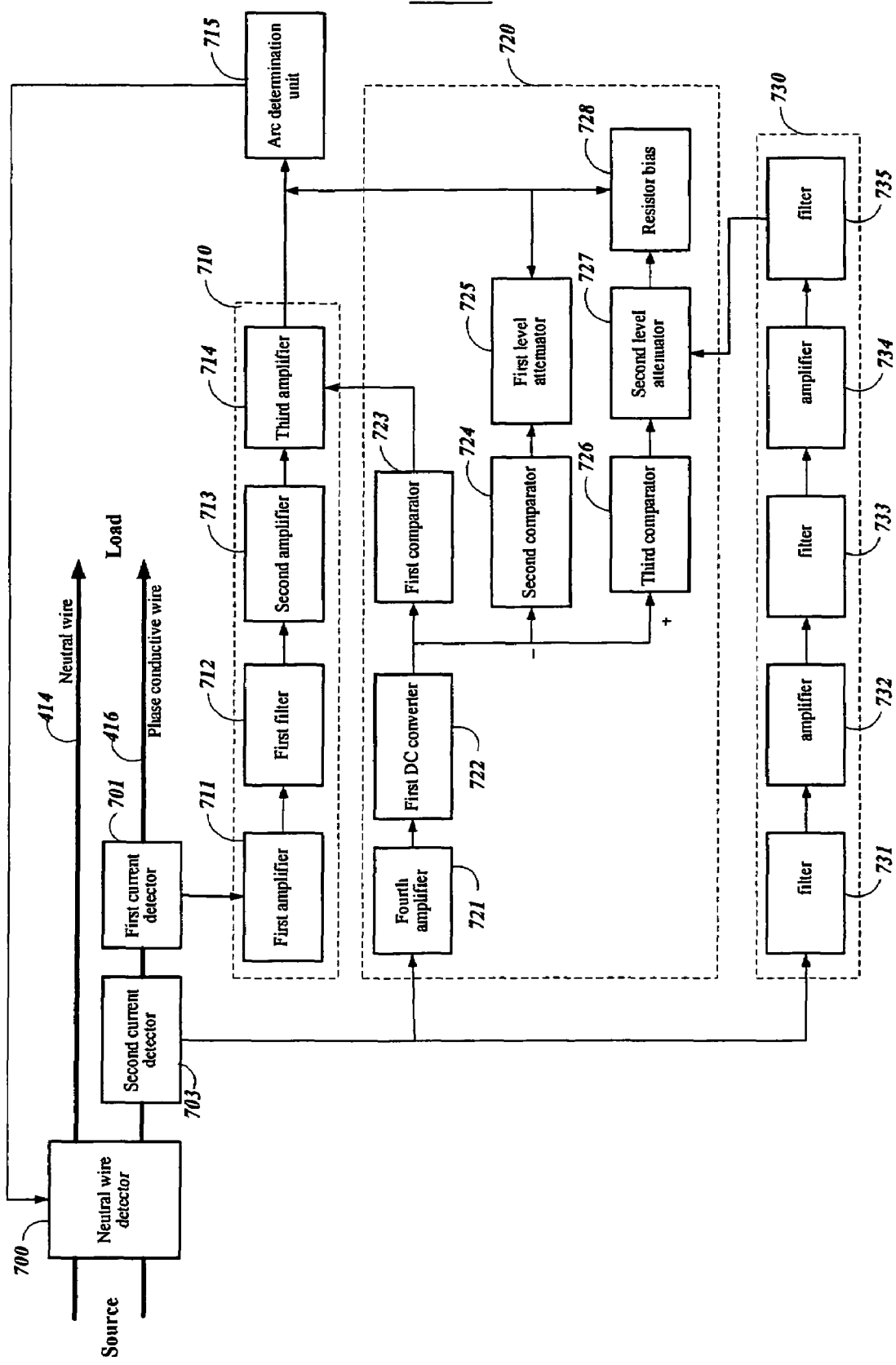
FIG. 28 is a block diagram illustrating another embodiment of the present invention.

FIG. 28 is a block diagram showing an apparatus for detecting an arc fault in accordance with a third embodiment of the present invention. Referring to FIG. 28, the apparatus includes an arc determination unit 715 for determining whether an arc signal detected by a phase conductive wire 416 of a circuit connecting a source and a load is a harmful arc signal, a neutral wire detector 700 for blocking a neutral wire 414 and the phase conductive wire 416 depending on a state detection result of the neutral wire to which a power is supplied from the source terminal and a control of the arc determination unit 715, a first current detector 701 for detecting an RF current flowing through the phase conductive wire 416, a first arc detector 710 for amplifying a weak RF signal outputted from the first current detector 701 and removing an unnecessary RF signal to detect the arc signal and output the detected arc signal to the arc determination unit 715, a second current detector 703 for detecting variation of current flowing through the phase conductive wire 418 and generating a signal in proportional to the variation of the current, a second arc detector 730 for amplifying an output signal of the second current detector 703 and detecting an arc signal through a high frequency band pass filter (HPF), and a controller 720 for controlling the first arc detector 710 according to an output signal of the second current detector 702, removing unnecessary signals and attenuating an input signal level to apply an attenuated signal level to the arc determination unit 715, and attenuating an output signal of the second arc detector 730.

The first arc detector 710 includes a first amplifier 711 for amplifying a weak radio frequency signal outputted from the first current detector 701, a first filter 712 for filtering an output signal of the first amplifier 711, and second and third amplifiers 713 and 714 for amplifying an output signal of the first filter 712 at two stages and outputting a two-stage amplified signal to the arc determination unit 715.

The second arc detector 730 includes a filter 731 for passing an RF component of an output signal of the second current detector 702 to limit a receipt signal level, an amplifier 732 for limiting and amplifying a level of an output signal of the filter 731, a filter 733 for high-pass filtering an output signal of the amplifier 732, an amplifier 734 for amplifying an RF signal attenuated while passing through the filter 733, to a predetermined level, and a filter 735 for removing noise from an output RF signal of the amplifier 734.

The controller 720 includes a fourth amplifier 721 for amplifying an output signal of the second current detector to a predetermined level, a first DC converter 722 for converting an output signal of the fourth amplifier 721 into a DC signal, a first comparator 723 for comparing the output DC signal of the first DC converter 722 with a reference signal and controlling an operation of the third amplifier 714 of the first arc detector 710 according to the comparing result, a second comparator 724 for comparing the output DC signal of the first DC converter 722 with a predetermined level signal and determining a surge/inrush signal, a first level attenuator 725 for removing unnecessary signals from an output signal of the second comparator 724 and outputting the unnecessary signals-removed signal to the arc determination unit 715, a third comparator 726 for comparing the output DC signal of the first DC converter 722 with a predetermined signal and determining whether or not there exists a load, a second level attenuator 727 driven by an output signal of the third comparator 726, for attenuating a level of a signal inputted to the arc determination unit 715 when load exists, and attenuating the level of the signal inputted to the arc determination unit 715 when a signal is outputted from the filter 735 of the second arc detector 730, and a resistance bias 728 for preventing a voltage of the second level attenuator 727 from dropping.

Next, operations of the apparatus constructed as above according to the third embodiment of the present invention will now be described with reference to FIGS. 28 and 29.

First, an arc signal is detected from the current flowing through the neutral wire and the phase conductive wire between the power supply source and the load, and it is then determined whether the detected arc signal is a harmful arc signal or a normal arc signal generated during a normal operation such as power on/off of electric devices.

Referring to FIG. 28, when the neutral wire 414 is opened, the power voltage is not normally operated. Accordingly, the neutral wire detector 700 detects whether the neutral wire 414 is opened prior to detecting current. In other words, since the circuit power is not normally operated when the neutral wire is opened, a solenoid (not shown) for switching off the power is not operated, an alarm generating device is not operated, and a switch is not turned on. If the solenoid is not operated, a magnet is not operated and accordingly the circuit is not normally operated.

Accordingly, the power supply to the phase conductive wire 416 is blocked when the neutral wire 414 is opened or by a control of the arc determination unit 715.

The first current detector 701 detects an RF arc signal flowing through the phase conductive wire 416. The first current detector 701 detects current in a parallel way.

A weak RF arc signal detected by the first current detector 701 is amplified and filtered through the first arc detector 710 and is output to the arc determination unit 715. When it is determined that the detected arc signal is a harmful arc signal, the arc determination unit 715 operates a circuit blocking unit (not shown) to block the harmful arc signal from being inputted.

The first arc detector 710 amplifies an RF signal including the arc signal, which is outputted from the first current detector 701 to a predetermined level through the first amplifier 711, the first filter 712, and the second and third amplifiers 713 and 714, filters the amplified RF signal, and outputs the filtered RF signal to the arc determination unit 715.

The second current detector 702 detects variation of current flowing through the phase conductive wire 418 and outputs a current detection signal.

The second arc detector 730 detects the arc through the filter 731 and the amplifier 732, the filter 733, amplifier 734, and the filter 735.

The filter 731 converts an output signal of the second current detector 702 into a signal for determining whether the arc is generated. In other words, the filter 731 rectifies a current detection signal, limits a signal level size, removes a low frequency that is a normal commercial frequency, and passes through and outputs only an RF signal.

The amplifier 732 amplifies the weak output RF signal of the filter 731 to a predetermined level.

The filter 733 high-pass filters an output RF signal of the amplifier 732, thereby eliminating noise contained in the output RF signal of the amplifier 732.

The amplifier 734 amplifies a signal level attenuated while passing through the filter 733 to a predetermined level.

Lastly, the filter 735 again filters the signal amplified by the amplifier 734, thereby eliminating noise and then operates the second level attenuator 727.

The controller 720 controls the first and second arc detectors 710 and 730 using the current detection signal detected by the second current detector 702.

In other words, the weak current detection signal outputted by the second current detector 702 is amplified through the fourth amplifier 721, and the amplified current detection signal is converted into a DC value, and is then inputted into the first through third comparators 723, 724 and 726.

The first comparator 723 compares the DC current detection signal inputted from the first DC converter 722 with a reference signal and controls the third amplifier 714 according to the comparing result.

The second comparator 724 compares the DC current detection signal inputted from the first DC converter 722 with a reference signal, determines whether the input DC current detection signal is a surge/inrush signal, and outputs a signal to the first level attenuator 725.

The first level attenuator 725 attenuates a signal including the surge/inrush according to the comparing result signal of the second comparator 724 when the signal including the surge/inrush is outputted from the third amplifier 714.

The first level attenuator 725 attenuates a signal including a surge when a signal including the surge is outputted from the filter 730.

The third comparator 726 compares the output signal of the first DC converter 722 with a set reference signal, determines whether there exists a load, and outputs a comparing result.

The second level attenuator 727 is controlled by the third comparator 726, and attenuates an input level of the arc determination unit 715 when there exists a load in the power line. Also, the second level attenuator 727 attenuates the output signal (no load) of the filter 735 of the second arc detector 730.

The resistance bias 728 prevents the voltage drop of the second level attenuator 727.

Figure 4:
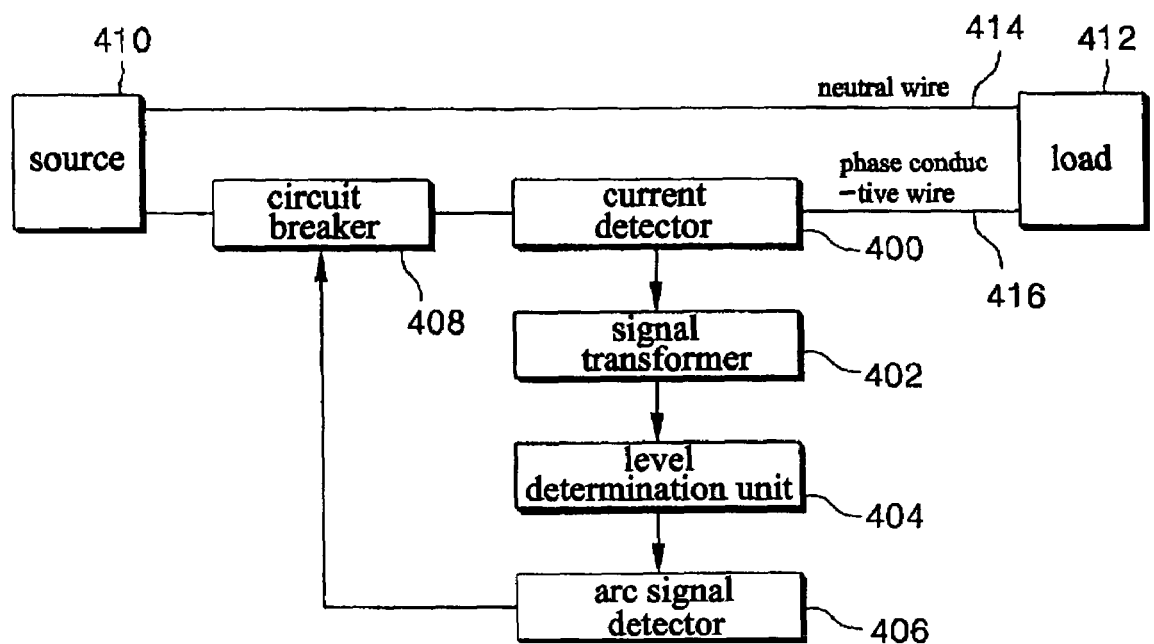
FIG. 4 is a block diagram showing a constitution of a general apparatus for detecting an arc fault in the art.
Figure 29:
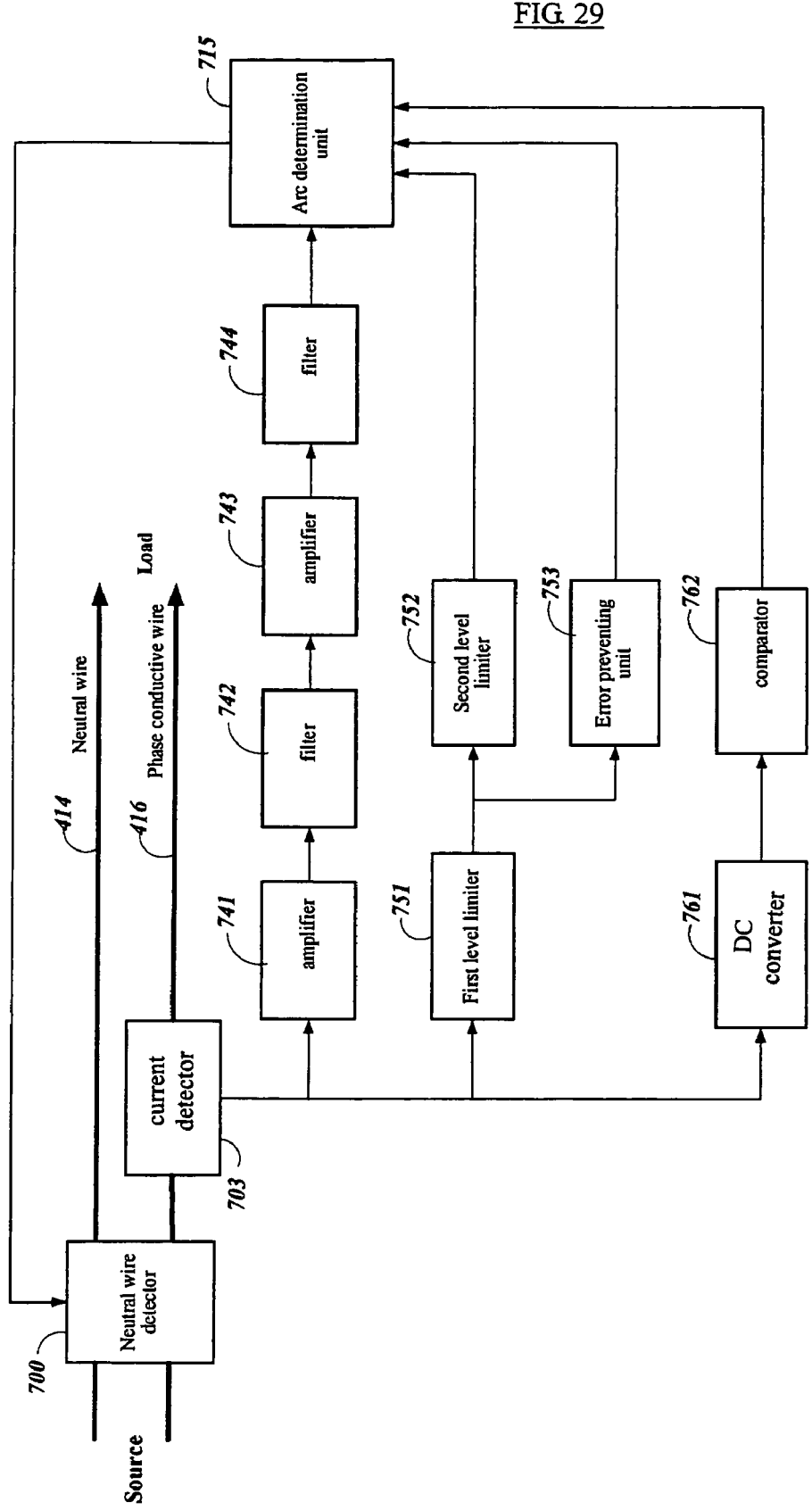
FIG. 29 is a block diagram illustrating a further embodiment of the present invention.

FIG. 29 is a block diagram of an apparatus of detecting an arc fault according to a fourth embodiment of the present invention. Referring to FIG. 4, the apparatus includes an arc determination unit 715 for determining whether an arc signal detected by a phase conductive wire 416 of a circuit connecting a source and a load is a harmful arc signal, a neutral wire detector 700 for blocking a neutral wire 414 and the phase conductive wire 416 depending on a state detection result of the neutral wire to which a power is supplied from the source terminal and a control of the arc determination unit 715, a current detector 703 for detecting variation of current flowing through the phase conductive wire 416 and generating a signal in proportional to the variation of the current, amplifiers and filters 741 through 744 for amplifying and filtering an output signal of the current detector 703 and outputting the amplified and filtered signal to the arc determination unit 715, a first level limiter 751, which is turned on or off by a predetermined level of output signal of the third current detector 703, for turning on or off the arc determination unit 715, an error preventing unit 753 for outputting a reset signal to the arc determination unit 715 when the predetermined level of output signal is inputted, a DC converter 761 for converting the output signal of the current detector 703 into a DC signal, and a comparator 762 for turning on or off, or resetting the arc determination unit 715 according to an output signal of the DC converter 761.

Next, operations of the apparatus constructed as above according to the third embodiment of the present invention will now be described with reference to FIG. 29.

Like the second current detector 702 shown in FIG. 28, the third current detector 703 detects variation of current flowing through the phase conductive wire 418 and outputs a current detection signal.

The current detection signal outputted by the third current detector 703 is amplified and filtered through the $21^{st}$ amplifier 741, the $21^{st}$ filter 742, the $22^{nd}$ amplifier 743 and the $22^{nd}$ filter 744 and is then outputted to the arc determination unit 715.

Next, operations of the apparatus constructed as above according to this embodiment of the present invention will now be described with reference to FIG. 29.

Like the second current detector 702 shown in FIG. 28, the current detector 703 detects variation of current flowing through the phase conductive wire 416 and outputs a current detection signal.

The current detection signal outputted by the current detector 703 is amplified and filtered through the amplifier 741, the filter 742, the amplifier 743 and the filter 744 and is then outputted to the arc determination unit 715.

Each of the first and second level limiters 751 and 752 may be a Zener diode, and passes only the current detection signal with a set predetermined level after the output detection signal of the current detector 703 is rectified.

The output signal of the first level limiter 751 operates the second level limiter 752 and the error preventing unit 753.

The output signal of the second level limiter 752 inputted into a comparator of the arc determination unit 715. In other words, if the second level limiter 752 is turned on, a reference signal of the comparator is changed with respect to a predetermined signal, thereby turning on or off the arc determination unit 715.

The input signal-of the error preventing unit 753 is charged or discharged, thereby inputting a DC conversion signal to the arc determination unit 715.

Meanwhile, the output current detection signal of the current detector 703 is converted into a DC signal through the DC converter 761 and is then inputted into the comparator 762.

The comparator 762 compares the input DC signal with a set reference signal and inputs a comparing result signal to the arc determination unit 715 as a reference value control signal or a reset signal.

Effect

As described above, in accordance with an apparatus for detecting an arc fault, since even a relatively small signal can be detected by amplifying a detected signal, there is a merit wherein it is possible to determine whether an arc is occurred by grasping a characteristic of a frequency of the detected signal. Additionally, since it is determined whether an arc is occurred by removing a noise component occurred when signals outputted from active devices are amplified, there is a merit to prevent an error trim previously.

What is claimed is:

1. An apparatus for detecting an arc signal in a conductive wire of a circuit connecting a source to a load and determining whether or not the detected arc signal is a harmful arc signal, the apparatus comprising:
a first current detector for detecting an RF current flowing through the conductive wire;
an arc determination unit;
a first arc detector for amplifying a weak RF signal outputted from the first current detector and removing an unnecessary RF signal to detect the arc signal and output the detected arc signal to the arc determination unit;
a second current detector for detecting variation of current flowing through the conductive wire and generating a signal in proportional to the variation of the current;
a second arc detector for amplifying an output signal of the second current detector and detecting an arc signal through a high frequency band pass filter; and
a controller for controlling the first arc detector according to an output signal of the second current detector, removing unnecessary signals and attenuating an input signal level to apply an attenuated signal level to the arc determination unit, and attenuating an output signal of the second arc detector.

2. The apparatus as claimed in claim 1, wherein the first current detector detects the current from the conductive wire using a first detection technique and the second current detector detects the current using a second detection technique.

3. The apparatus as claimed in claim 1, wherein the first arc detector comprises:
a first amplifier for amplifying the weak RF signal outputted from the first current detector;
a first filter for filtering an output signal of the first amplifier; and
second and third amplifiers for amplifying an output signal of the first filter at two stages and outputting a two-stage amplified signal to the arc determination unit.

4. The apparatus as claimed in claim 1, wherein the second arc detector comprises:
another filter for passing an RF component of an output signal of the second current detector to limit a receipt signal level;
another amplifier for limiting and amplifying a level of an output signal of the $11^{th}$ filter;
an additional filter for high-pass filtering an output signal of the another amplifier;
an additional amplifier for amplifying an RF signal attenuated while passing through the additional filter, to a predetermined level; and
a further filter for removing noise from an output RF signal of the additional amplifier.

5. The apparatus as claimed in claim 1, wherein the controller comprises:
a fourth amplifier for amplifying an output signal of the second current detector to a predetermined level;
a first DC converter for converting an output signal of the fourth amplifier into a DC signal;
a first comparator for comparing the output DC signal of the first DC converter with a reference signal and controlling an operation of the third amplifier of the first arc detector according to the comparing result;
a second comparator for comparing the output DC signal of the first DC converter with a predetermined level signal and determining a surge signal;
a first level attenuator for removing unnecessary signals from an output signal of the second comparator and outputting the unnecessary signals-removed signal to the arc determination unit;
a third comparator for comparing the output DC signal of the first DC converter with a predetermined signal and determining whether or not there exists a load;
a second level attenuator driven by an output signal of the third comparator, for attenuating a level of a signal inputted to the arc determination unit when there exists the load, and attenuating the level of the signal inputted to the arc determination unit when a signal is outputted from the second arc detector; and
a resistance bias for preventing a voltage of the second level attenuator from dropping.

6. The apparatus as claimed in claim 1, further comprising a neutral wire detector for blocking the neutral wire and the phase conductive wire by a state detection result of the neutral wire to which a power is supplied from the source.

* * * * *